United States Patent
Jung et al.

(10) Patent No.: US 12,550,829 B2
(45) Date of Patent: Feb. 17, 2026

(54) POD AND PLANT CULTIVATION APPARATUS HAVING SAME

(71) Applicant: LG ELECTRONICS INC., Seoul (KR)

(72) Inventors: Yong Ki Jung, Seoul (KR); Tae Yang Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 413 days.

(21) Appl. No.: 17/776,382

(22) PCT Filed: Oct. 20, 2020

(86) PCT No.: PCT/KR2020/014296
§ 371 (c)(1),
(2) Date: May 12, 2022

(87) PCT Pub. No.: WO2021/096084
PCT Pub. Date: May 20, 2021

(65) Prior Publication Data
US 2022/0394934 A1 Dec. 15, 2022

(30) Foreign Application Priority Data
Nov. 15, 2019 (KR) .................. 10-2019-0147061

(51) Int. Cl.
*A01G 9/029* (2018.01)
*A01G 9/20* (2006.01)
*A01G 9/24* (2006.01)

(52) U.S. Cl.
CPC ............. *A01G 9/0293* (2018.02); *A01G 9/20* (2013.01); *A01G 9/247* (2013.01)

(58) Field of Classification Search
CPC .................................................. A01G 9/0297
See application file for complete search history.

(56) References Cited

U.S. PATENT DOCUMENTS 3,524,279 A * 8/1970 Adams ................. A01G 9/0295
47/87
3,733,745 A * 5/1973 Ingerstedt .............. A01G 9/029
47/77

(Continued)

FOREIGN PATENT DOCUMENTS

JP 08-205616 8/1996
KR 20-0278184 6/2002

(Continued)

OTHER PUBLICATIONS

Translation of KR 200483158 Y1 (Year: 2017).*

(Continued)

*Primary Examiner* — Monica L Perry
*Assistant Examiner* — Brittany A Lowery
(74) *Attorney, Agent, or Firm* — KED & ASSOCIATES, LLP

(57) ABSTRACT

Proposed is a pod and a plant cultivation apparatus having the pod of the present disclosure. In the pod, cultivation preparation is completed simply by removing a package that covers an upper portion of a container constituting the pod and seating the pod on the plant cultivation apparatus. Accordingly, even a user who does not have background knowledge of plant cultivation easily cultivate plants.

18 Claims, 25 Drawing Sheets

(56) References Cited

U.S. PATENT DOCUMENTS

| | | | |
|---|---|---|---|
| 4,124,953 A | 11/1978 | Patton | |
| 4,903,432 A * | 2/1990 | Velagaleti | A01G 27/04 47/81 |
| 8,549,788 B2 * | 10/2013 | Bryan, III | A01G 31/02 47/62 C |
| 2012/0180387 A1 * | 7/2012 | Walli | A01G 9/0291 47/65.7 |
| 2015/0156973 A1 * | 6/2015 | Prinster | A01G 9/16 47/65.7 |
| 2016/0174457 A1 * | 6/2016 | Lynch | G06F 16/9554 47/56 |
| 2016/0198621 A1 * | 7/2016 | Ohlund | A01G 24/44 47/19.1 |
| 2018/0370717 A1 * | 12/2018 | Voermans | A01G 18/64 |
| 2019/0183062 A1 | 6/2019 | Pham et al. | |
| 2020/0146231 A1 | 5/2020 | Yang et al. | |
| 2020/0344965 A1 * | 11/2020 | Song | H05B 47/16 |
| 2021/0204489 A1 * | 7/2021 | Choi | A01G 7/045 |

FOREIGN PATENT DOCUMENTS

| | | |
|---|---|---|
| KR | 10-2012-0007420 | 1/2012 |
| KR | 10-2012-0028040 | 3/2012 |
| KR | 20-0465385 | 2/2013 |
| KR | 10-1240375 | 3/2013 |
| KR | 20-0467246 | 6/2013 |
| KR | 10-1400375 | 6/2014 |
| KR | 10-1422636 | 7/2014 |
| KR | 101954251 | 2/2019 |
| WO | WO 92/17382 | 10/1992 |
| WO | WO 2021080141 | 4/2021 |

OTHER PUBLICATIONS

Translation of JP_2013081429_A (Year: 2013).*
International Search Report dated Jan. 27, 2021 issued in Application No. PCT/KR2020/014296.
Extended European Search Report dated Oct. 31, 2023 issued in Application No. 20886924.8.

* cited by examiner

POD AND PLANT CULTIVATION APPARATUS HAVING SAME

CROSS-REFERENCE TO RELATED PATENT APPLICATIONS

This application is a U.S. National Stage Application under 35 U.S.C. § 371 of PCT Application No. PCT/KR2020/014296, filed Oct. 20, 2020, which claims priority to Korean Patent Application No. 10-2019-0147061, filed Nov. 15, 2019, whose entire disclosures are hereby incorporated by reference.

TECHNICAL FIELD

The present disclosure relates to a pod providing a different cultivation area for each type of plant and a plant cultivation apparatus capable of cultivating plants while automatically performing air circulation, light supply, and water supply.

BACKGROUND ART

In general, a plant cultivation apparatus is a device cultivating plants in a seed state.

Recently, the plant cultivation apparatus has been provided in various forms that may easily cultivate plants indoors.

The indoor plant cultivation apparatus may be classified into a hydroponic cultivation apparatus and a soil cultivation apparatus.

The hydroponic cultivation apparatus is a device that cultivates a plant by a method in which roots of a plant are immersed in water mixed with a nutrient solution, as proposed in Korean Patent Application Publication No. 10-2012-0007420 (document 1), Korean Patent Application Publication No. 10-2012-0028040 (document 2), Korean Patent No. 10-1240375 (document 3), and Korean Patent No. 10-1422636 (document 4).

However, in the case of the hydroponic cultivation apparatus such as related arts 1 to 4, when supply water in which the roots of plants are immersed is continuously used without circulation or replacement, contamination of the supply water, such as green algae, occurs, and contamination of the supply water causes odor.

Further, the soil cultivation apparatus is a device using a cultivation method of planting a plant (or seeds) in soil of a pot and continuously supplying water to the pot, as proposed in Korean Patent No. 10-1400375 (document 5), Korean Utility Model Registration No. 20-0467246 (document 6), and Korean Utility Model Registration No. 20-0465385 (document 7).

In this case, compared to the hydroponic cultivation apparatus using nutrient solution, the soil cultivation apparatus may further improve growth of plants due to nutrients in the soil and increase the growth rate of the plants.

However, in the case of above-described documents 5 and 7, the soil cultivation apparatus may be operated such that, supply water sufficiently stored in a water storage is supplied to the soil in culture ground by using an absorbing member, without periodically supplying water to the soil. In the case of document 6, since the soil cultivation apparatus is provided such that a plug tray is supplied in a state of being immersed in nutrient solution of a supply bed, the soil in the culture ground (or plug tray) may be discharged outward of the plant cultivation apparatus so that sufficient soil may not be provided.

In addition, in the case of documents 5 to 7, considering that nutrient solution is supplied into the supply water stored in the water storage, contamination of the supply water due to deterioration of the nutrient solution may occur.

Furthermore, in documents 5 and 7, a circulation structure of pumping the supply water stored in the water storage of a growth chamber and supplying the supply water to each water storage is proposed. Therefore, when the supply water stored in the water storage of the growth chamber is contaminated, supply water stored in other water storages may be easily contaminated.

Furthermore, in documents 5 to 7, due to a water supply hose connected to the water storage (or nutrient solution container), the water storage may not be taken out of a cabinet. When the washing of the water storage is not continuously performed, contamination of the supply water may occur severely.

Meanwhile, the conventional indoor plant cultivation apparatus is exposed to the indoor environment, so that the cultivation apparatus may be affected by the indoor temperature, humidity, or brightness.

That is, the growth of plants may have a great effect on the indoor temperature.

Accordingly, the conventional hydroponic or soil cultivation apparatus is provided with a lighting device in order to always provide predetermined light, and additionally provided with a door in the cabinet to open and close the cabinet.

However, the closed-type cultivation apparatus may have a problem that air circulation is not efficiently performed and plants do not grow properly.

For example, in the night, even though the plants should be supplied with sufficient carbon dioxide, air circulation may not be efficiently performed, such as insufficient carbon dioxide due to the closed environment.

Furthermore, the cultivation apparatus according to the above-described related arts (hydroponic cultivation apparatus, soil cultivation apparatus, closed-type cultivation apparatus, etc.) may have the limitation of installation place.

That is, as shown in documents 3 to 7, in the case of the cultivation apparatus capable of temperature control or air circulation, as the structure for supplying or discharging air is not considered at the time of built-in installation, when the cultivation apparatus is provided in a built-in type, such as a sink or a closet, air supply into the cabinet may not be efficiently provided, thereby installation of the plant cultivation apparatus may be performed only in open areas.

Furthermore, although the conventional cultivation apparatus is intended to cultivate various plants, a seeding pattern in consideration of the minimum cultivation area for plants to grow is not considered at all. The conventional cultivation apparatus does not have environment in which plants can be cultivated without failure even when a user does not know about the cultivation distance that varies depending on plant seeds.

When seeds contain moisture, the volumes thereof expand rapidly and the seeds may be randomly scattered. The conventional cultivation apparatus is not considered at all for the means to solve the problem, and soil is compressed only for providing nutrients. Therefore, the user should directly cover the seeds with the soil to prevent the seeds from being scattered. However, in this case, since the user has to cover the seeds with the soil with a shovel or a gloved hand, additional work is required.

DISCLOSURE OF INVENTION

Technical Problem

Accordingly, the present disclosure has been made keeping in mind the above problems occurring in the related art, and the present disclosure is intended to a new-type plant cultivation apparatus, wherein even when the plant cultivation apparatus is installed in a specific space by a built-in method, it is possible to facilitate air circulation and maintenance.

Another objective of the present disclosure is to provide a new-type plant cultivation apparatus in which moisture supplied to plants may be always supplied only in an appropriate amount.

A further objective of the present disclosure is to provide a new-type plant cultivation apparatus, wherein the plant cultivation apparatus is configured of a non-circulation structure in which supply water stored in a separate water tank blocked from external environment is supplied only when necessary, so that contamination of the supply water may be prevented.

A further objective of the present disclosure is to provide a new-type plant cultivation apparatus capable of performing temperature control for plant cultivation to cultivate various plants.

A further objective of the present disclosure is to provide a new-type plant cultivation apparatus capable of performing different temperature control for a cultivation area of each layer.

A further objective of the present disclosure is to provide a new-type plant cultivation apparatus capable of facilitating water replenishment or cleaning of the water tank for storage of supply water.

A further objective of the present disclosure is to provide a new-type plant cultivation apparatus having a pod in which seeds are arranged at predetermined intervals so that seeding is possible even when the user does not have prior knowledge necessary for plant cultivation.

Solution to Problem

In order to accomplish the above objectives, a plant cultivation apparatus of the present disclosure may be configured to include a machine chamber frame providing a machine chamber. Wherein the machine chamber of the machine chamber frame may be configured such that inflow and discharge of indoor air may be performed through the front of the machine chamber.

The plant cultivation apparatus of the present disclosure may be configured such that air circulating in a cultivation room may contain part of air introduced in the machine chamber to be heat-exchanged, and be supplied into the cultivation room to circulate inside the cultivation room. Whereby, the plant cultivation apparatus may be configured as a closed-type structure capable of temperature control.

The plant cultivation apparatus of the present disclosure may have the machine chamber that may be formed to be open forward, so that indoor air may be introduced through the open front of the machine chamber into the machine chamber, be heat-exchanged with a condenser and cool a compressor, and then be discharged indoors. Whereby, the plant cultivation apparatus may be installed in a specific space by a built-in method.

The plant cultivation apparatus of the present disclosure may have the machine chamber that may be provided at a lower portion of the cultivation room and be open forward, so that the air discharged from the machine chamber may face a floor of the indoor. Whereby, discomfort of the user due to the discharged air may be prevented in advance.

The plant cultivation apparatus of the present disclosure may have an intake and exhaust grill on the open front surface of the machine chamber frame. Whereby, a direction of the discharged air from the machine chamber may be guided and the inside of the machine chamber may be prevented from being exposed outward.

The plant cultivation apparatus of the present disclosure may be configured to have a partition in the machine chamber so that an air inflow side and an air outflow side may be separated. Whereby, the temperature of air passing through an evaporator and supplied to the cultivation room may be efficiently performed.

The plant cultivation apparatus of the present disclosure may be configured such that a portion where a circulating fan assembly is installed may communicate with one space of opposite spaces in the machine chamber, which are divided by the partition. Whereby, the air introduced in the machine chamber of the machine chamber frame may be supplied into the cultivation room.

The plant cultivation apparatus of the present disclosure may have a residual water detection sensor may be provided at a bottom in the cultivation room provided in a cabinet. Whereby, a water level of supply water in a bed placed on the bottom in the cultivation room may be accurately detected.

In the plant cultivation apparatus of the present disclosure, the compressor and the condenser constituting a temperature control module may be provided in the machine chamber in the machine chamber frame and the evaporator may be provided in a rear space of the cultivation room in the cabinet. Whereby, the air in the machine chamber may pass through the evaporator and then be supplied into the cultivation room.

In the plant cultivation apparatus of the present disclosure, the condenser may be provided in the air inflow side in the machine chamber. Whereby, condensation of refrigerant may be efficiently achieved.

In the plant cultivation apparatus of the present disclosure, the compressor may be provided in a portion of a flow path in the machine chamber, the part through which the air passing through the condenser passes. Whereby, high temperature air passing through the compressor may be prevented from affecting the condenser.

The plant cultivation apparatus of the present disclosure may have  the cabinet a lighting module that is provided on an upper surface of the cultivation room. Whereby, light source may be sufficiently supplied to plants cultivated in the cultivation room.

The plant cultivation apparatus of the present disclosure may be configured such that an upper cultivation room and a lower cultivation room may be partitioned from each other by the lighting module. Whereby, cultivation space may be secured as large as possible.

The plant cultivation apparatus of the present disclosure may be configured such that the residual water detection sensor may be provided on the lighting module. Whereby, the lighting module may be used as a wall surface partitioning the cultivation rooms.

The plant cultivation apparatus of the present disclosure may have the cabinet in which a water supply module is provided. Whereby, a required amount of water may be automatically supplied to the plants.

The plant cultivation apparatus of the present disclosure may have the water supply module that may include a water tan, a water pump, and a supply hose. Whereby, an appropriate amount of supply water may be supplied periodically or non-periodically without remaining in the bed, so that green algae or odor may be prevented from occurring.

In the plant cultivation apparatus of the present disclosure, the water tank may be positioned at a lower space in the cultivation room. Whereby, use of a space may be improved.

In the plant cultivation apparatus of the present disclosure, the water tank may be positioned at a front space in the cultivation room and be configured to be ejected forward from the cabinet. Whereby, the user can easily perform water replenishment or cleaning in the water tank.

The plant cultivation apparatus of the present disclosure may be configured such that the water tank may be formed in a container body that may be open at an upper surface and the open upper surface of the water tank may be opened and closed by an opening and closing cover. Whereby, cleaning in the water tank may be efficiently performed.

The plant cultivation apparatus of the present disclosure, the opening and closing cover may be connected to a water supply connection tube. Whereby, the supply water stored in the water tank may be supplied to the water pump.

The plant cultivation apparatus of the present disclosure may include an inlet tube that may be formed such that the water supply connection tube may protrude from a rear lower surface of the opening and closing cover to a bottom in the water tank. Whereby, the supply water in the water tank may be used as much as possible.

The plant cultivation apparatus of the present disclosure may include a connection tube formed such that the water supply connection tube may be extended to a rear surface of an upper end of the inlet tube. Whereby, the connection tube and the water pump may be connected to each other and be released from the connection by receiving operation in which the water tank moves back and forth.

The plant cultivation apparatus of the present disclosure may have the opening and closing cover that may be configured to block the water tank. Whereby, after the opening and closing cover is opened, the water tank may be ejected.

The plant cultivation apparatus of the present disclosure may have a water reservoir at a rear surface of the bed. Whereby, when the bed is retracted into the cultivation room, supply water may be supplied to the bed from the supply hose.

A pod of the present disclosure may be configured such that, a seeding cover may communicate with a package, a seed image and guide holes may be formed on the package depending on a type of seed, and seeds may be planted on positions of a medium corresponding to the guide holes. Whereby, the user can cultivate plants without prior knowledge of the plants.

The pod of the present disclosure may have a seed paper that is seated on an upper surface of the medium with seeds held on the seed paper. Whereby, the seeds may not be scattered and may be placed in regular positions of the medium.

Advantageous Effects of Invention

As described above, the pod and the plant cultivation apparatus having the pod of the present disclosure have various effects as follows.

First, the plant cultivation apparatus of the present disclosure may be configured such that air is suctioned and discharged through the front surface of the machine chamber, despite having the closed-type structure. Accordingly, even when the apparatus is located in a specific narrow space in the built-in method, the air circulation in the apparatus can be performed easily.

The plant cultivation apparatus of the present disclosure may be configured of the bed of the forward ejected structure. Therefore, even when the plant cultivation apparatus is provided in a narrow space, maintenance, such as replacement of the pod or cleaning of the bed, can be performed easily.

In the plant cultivation apparatus of the present disclosure, moisture supplied to plants may be always supplied only in an appropriate amount. Accordingly, residual water due to excessive water supply can be prevented and thus contamination and odor of the residual water can be prevented.

The plant cultivation apparatus of the present disclosure may be configured of a non-circulation structure in which supply water stored in the separate water tank blocked from external environment may be supplied only when necessary. Accordingly, contamination of supply water can be prevented.

The plant cultivation apparatus of the present disclosure may adopt the structure in which air circulation may be performed for each cultivation room. Accordingly, it is possible to cultivate various types of plants at the same time as the temperature control for plant cultivation may be performed for each cultivation room.

As the plant cultivation apparatus of the present disclosure may be arranged and configured so as to easily remove the water tank 710, water replenishment or cleaning of the water tank 710 can be easily performed.

Accordingly, that moisture on the surface of the door 130 can be removed, thereby facilitating internal observation.

The plant cultivation apparatus of the present disclosure may be configured such that air introduced in the machine chamber passes through the condenser and then is introduced into the rear space in the cabinet without passing through the compressor. Therefore, the temperature can be well controlled.

In the plant cultivation apparatus of the present disclosure, the bed may have the depression and the depression may be formed in the track structure having the dam part in the inside portion thereof. Accordingly, residual water may be minimized and the plurality of the pod may absorb supply water at the same time.

In the plant cultivation apparatus of the present disclosure, the lighting module may divide the inside of the cabinet into the upper cultivation room and the lower cultivation room. Accordingly, the cultivation space can be secured as wide as possible compared to having a separate partition wall.

The pod of the present disclosure may have the through hole on the seeding cover, and the seeding interval may be determined by the package having the guide hole selectively shielding the through hole. Accordingly, the user can cultivate plants without knowledge of plants, because seeds are planted in the medium at an optimum interval for each plant in response to the guide hole formed on the package.

In the pod of the present disclosure, the seeds may be held on the seed paper and seated on the upper surface of the medium. Accordingly, the seeds may not be scattered even when absorbing moisture, and can be seated on the seeding space.

The pod of the present disclosure may use the same container regardless of the type of plant, and the type of package that is attached to the outer surface of the container may be changed and attached to the pod depending on the type of plant. The cost of manufacturing the container and the seeding cover for each type of plant can be reduced.

MODE FOR THE INVENTION

Figure 1:
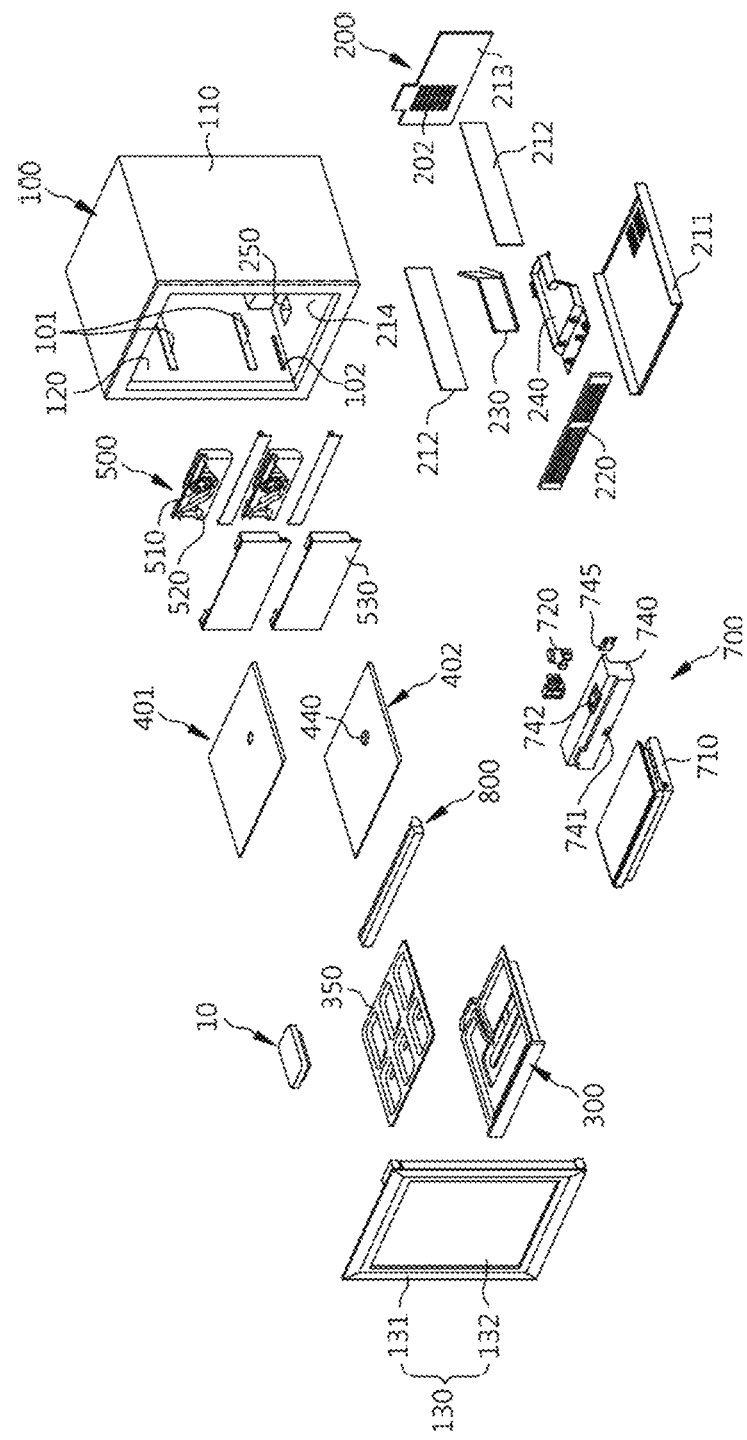
FIG. 1 is an exploded-perspective view showing a plant cultivation apparatus according to an embodiment of the present disclosure.

Hereinbelow, some embodiments of the present disclosure will be described in detail through exemplary drawings. Like reference numerals are used to identify like components throughout different drawings. Further, in the following description, if it is decided that the detailed description of known function or configuration related to the present disclosure makes the subject matter of the invention unclear, the detailed description will be omitted.

Further, when describing the components of the present disclosure, terms such as first, second, A, B, (a) or (b) may be used. Since these terms are provided merely for the purpose of distinguishing the components from each other, they do not limit the nature, sequence or order of the components. It will be understood that when a component is referred to as being "coupled" or "connected" to another component, it can be directly coupled or connected to the other component or, the other component can be "coupled" or "connected" between each component.

Hereinbelow, exemplary embodiments of a plant cultivation apparatus of the present disclosure will be described with reference to FIGS. 1 to 29.

Figure 2:
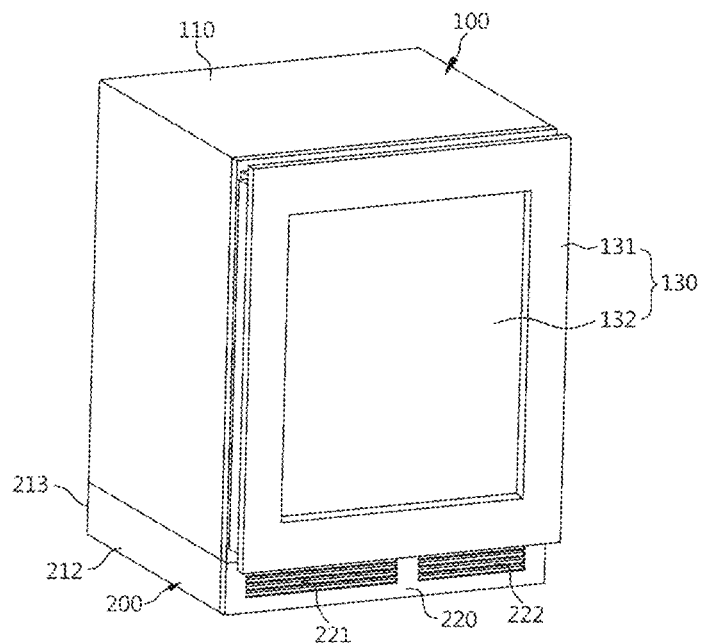
FIG. 2 is a perspective view showing the exterior of the plant cultivation apparatus according to the embodiment of the present disclosure, the plant cultivation apparatus in a state in which a door of the plant cultivation apparatus is closed.
Figure 3:
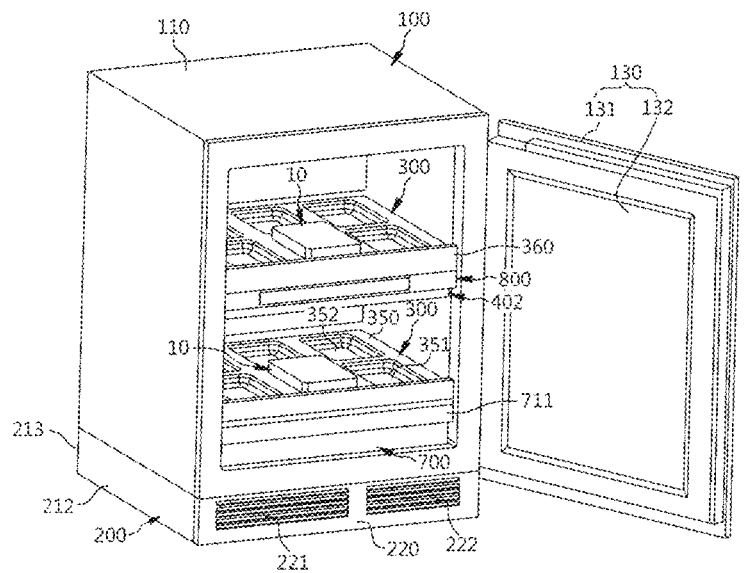
FIG. 3 is a perspective view showing the exterior of the plant cultivation apparatus according to the embodiment of the present disclosure, the plant cultivation apparatus in a state in which the door thereof is opened.
Figure 4:
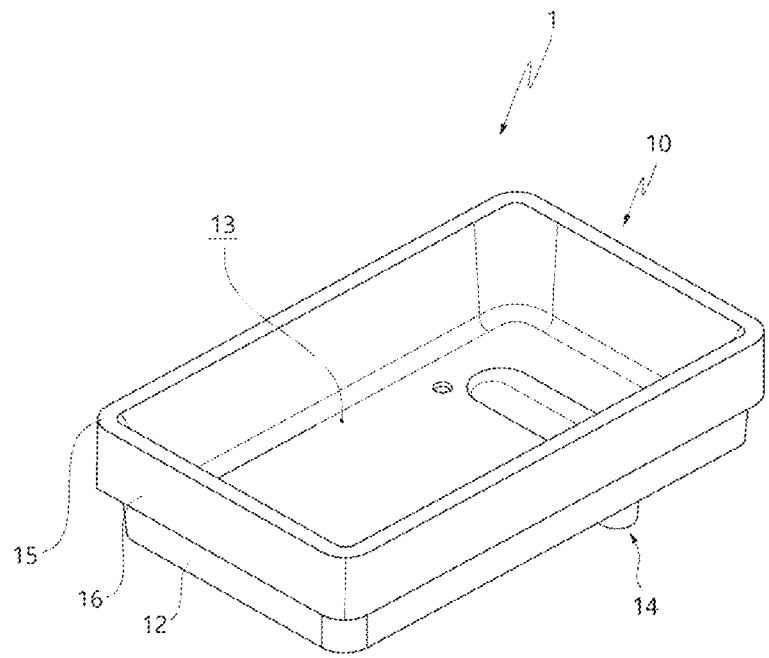
FIG. 4 is a perspective view showing a container of a pod according to the embodiment of the present disclosure.
Figure 5:
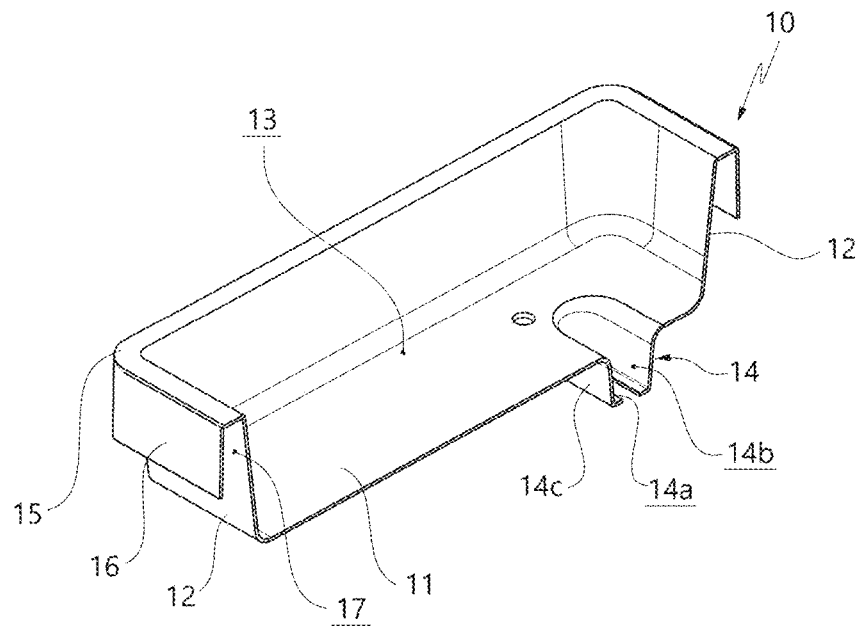
FIG. 5 is a sectioned-perspective view showing the container of the pod according to the embodiment of the present disclosure.
Figure 6:
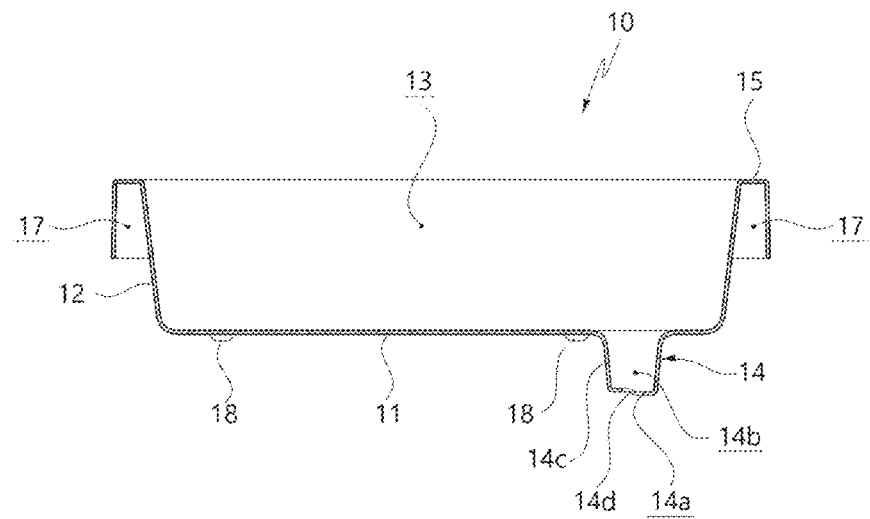
FIG. 6 is a side section view showing the container of the pod according to the embodiment of the present disclosure.
Figure 7:
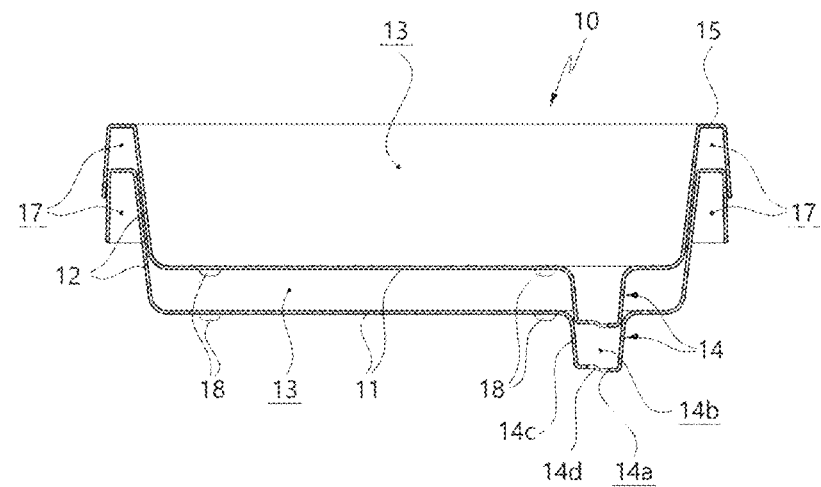
FIG. 7 is a side section view showing the container of the pod according to the embodiment of the present disclosure.
Figure 8:
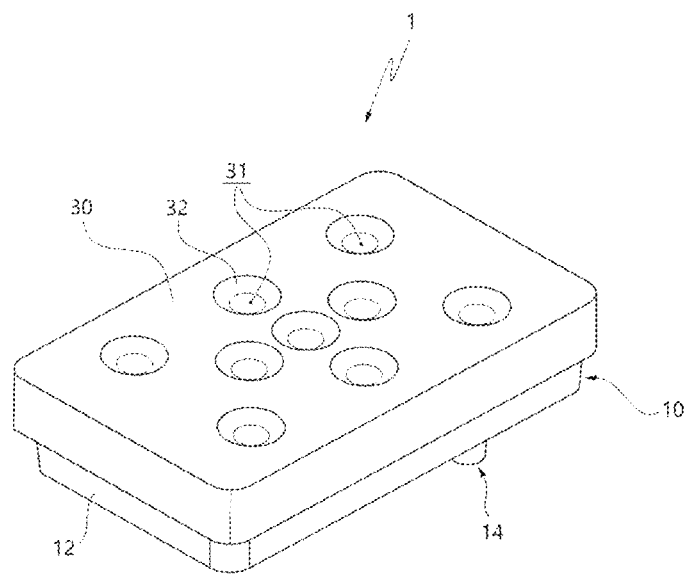
FIG. 8 is a perspective view showing a first embodiment of the pod according to the embodiment of the present disclosure.
Figure 9:
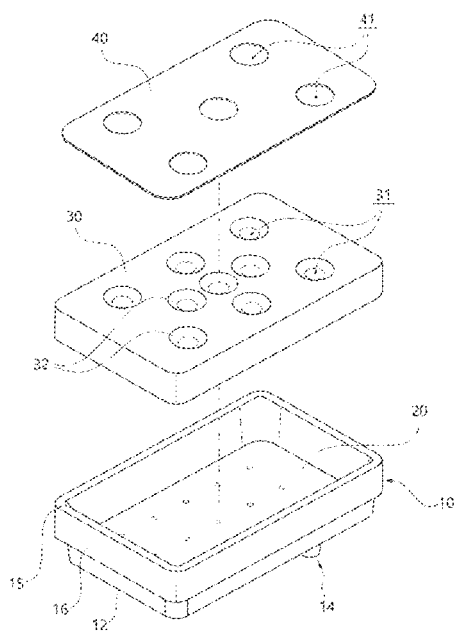
FIG. 9 is an exploded-perspective view showing the first embodiment of the pod according to the embodiment of the present disclosure.
Figure 10:
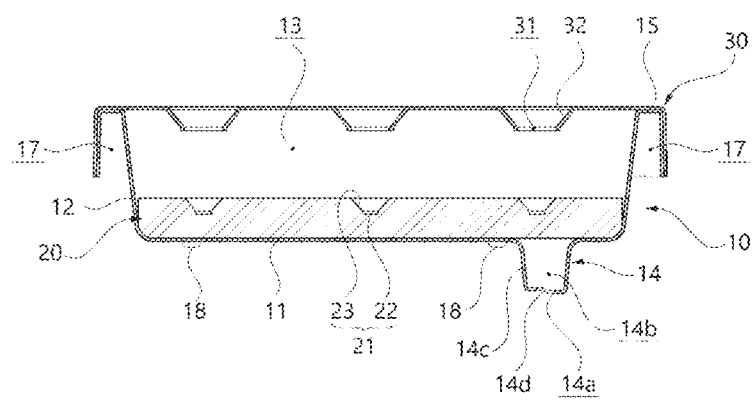
FIG. 10 is a side section view showing the first embodiment of the pod according to the embodiment of the present disclosure.
Figure 11:
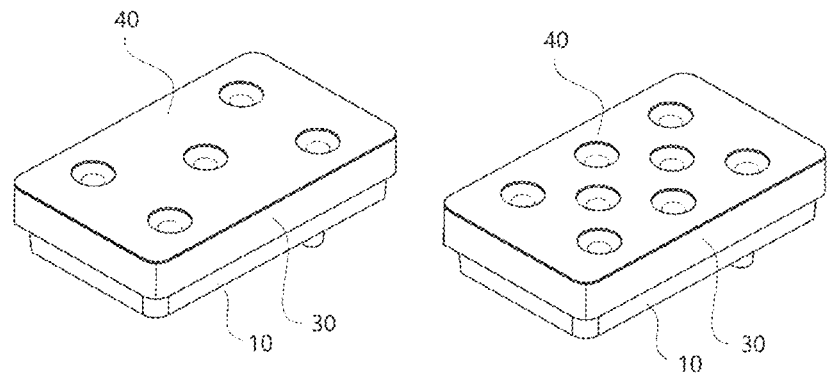
FIG. 11 is a perspective view showing the first embodiment of the pod according to the embodiment of the present disclosure.

FIG. 1 is an exploded-perspective view showing a plant cultivation apparatus according to an embodiment of the present disclosure. FIG. 2 is a perspective view showing the exterior of the plant cultivation apparatus according to the embodiment of the present disclosure. FIG. 3 is a perspective view showing the plant cultivation apparatus according to the embodiment of the present disclosure, the plant cultivation apparatus in a state in which a door thereof is opened.

As shown in the drawings, the plant cultivation apparatus according to the embodiment of the present disclosure may include a cabinet 100, a machine chamber frame 200, and a bed 300 on which a pod is seated. In particular, a machine chamber 201 may be configured to be open forward, so that air intake and discharge into the machine chamber 201 may be performed toward the front of the cabinet 100. Accordingly, the plant cultivation apparatus may be installed in a specific space, such as installation by a built-in method.

The plant cultivation apparatus will be described by each configuration.

First, the pod 1 will be described with reference to FIGS. 4 to 7.

the pod 1 may be configured of a structure in which a seeding cover 30, 60 or a package 40, 70, 86, 87 is covered on a container 10 that is open upward and contains a medium 20, 50, 83, or a structure in which the seeding cover 30, 60 and the package 40, 70, 86, 87 are covered together on the container 10. The medium 20, 50, 83 may be provided with plant seeds planted therein. Of course, a user can plant seeds in the medium 20, 50, 83. However, in order to reduce the inconvenience that the user has to separately obtain seeds, it is preferably that the medium 20, 50, 83 is provided with seeds planted therein.

Furthermore, the pod 1 may be provided while seeds are simply placed at predetermined intervals on the medium 20, 50, 83 without being planted into the medium 20, 50, 83.

The container 10 may include a base 11 providing a lower surface of the container 10, and a sidewall 12 formed along an edge of the base 11. The base 11 may have a flat plate shape. A receiving space 13 that is open upward may be defined by the base 11 and the sidewall 12 formed along the edge of the base 11. The medium 20, 50, 83 may be received in the receiving space 13.

The sidewall 12 may be formed to have an obtuse angle with the base 11. That is, the receiving space 13 may have a form in which a sectional area thereof increases as the area goes from the base 11 to an entrance of the receiving space 13. The structure may be advantageous when filling a large amount of contents in the container 10 placed in a small area. That is, it is preferable in that the medium 20, 50, 83 may be maximally received in the receiving space within a limited space of the cultivation room 121, 122. In addition, the pod may be configured of a structure that is widen as the pod goes from the base 11 to the entrance of the receiving space 13, so that a plurality of pods 1 without the medium 20, 50, 83 may be stacked. This saves space to store the pods 1 containing no contents.

In addition, a protrusion 14 that protrudes in a direction away from the receiving space 13 may be provided on a lower surface of the pod 1, that is, the base 11. The protrusion 14 may absorb moisture through a slit 14a formed on a fore end thereof and supply the moisture to the medium 20, 50, 83. The slit 14a may be a gap that is formed on a fore end of a protruding wall 14c and allows an absorption member 81 provided in the seating space 14b to absorb external moisture. In addition, the protrusion 14 provided in the pod 1 may be arranged to be biased toward an end of either side of the lower surface of the pod 1. For example, when the pod is viewed from the lower surface thereof, the protrusion 14 may be formed by protruding from a circumferential portion of one side of the pod 1.

The protrusion 14 may have an exterior formed by the protruding wall 14c in which the seating space 14b is provided. Like the sidewall 12, the protruding wall 14c may be preferably formed to have an obtuse angle with the base 11. Through the structure, the seating space 14b may be configured relatively wide.

The seating space 14b may communicate with the receiving space 13. The absorption member 81, such as a sponge, may be seated in the seating space 14b. The absorption member 81 may absorb and hold moisture through the slit 14a and transfer the moisture to the medium 20, 50, 83 in the receiving space 13.

The seating space 14b may have a capillary wall (not shown) having a fine mesh structure formed along an edge of the slit 14a toward the seating space 14b instead of the absorption member 81 seated therein. The external moisture may flow along the capillary wall due to capillarity and then be supplied to the medium 20, 50, 83 received in the receiving space 13. The capillary wall may be variously implemented other than the structure in which a fine mesh structure is formed along the edge of the slit 14a. For example, the capillary wall may be arranged in the seating space 14*b* while being laminated to form several layers in a perpendicular direction to a protruding direction of the protrusion 14. The capillary wall may be formed from different material than the pod 1.

Meanwhile, a step 14*d* may be formed at the fore end of the protruding wall 14*c* on which the slit 14*a* is formed. The step 14*d* may impart a height difference to the protruding wall 14*c* and be formed at edges of opposite ends of the slit 14*a*. That is, by the step 14*d*, heights of the opposite ends of the slit 14*a* formed on the fore end of the protruding wall 14*c* may be different from each other. When the fore end of the protruding wall 14*c* is seated on a bottom surface of the bed 300, the step 14*d* may prevent the protruding wall 14*c* from being in close contact with the bottom surface of the bed 300, so that the slit 14*a* may be prevented from being blocked by the bottom surface of the bed 300.

A flange 15 may be formed on a fore end of the sidewall 12 extended from the base 11. The flange 15 may be parallel to the base 11 and be extended out of the receiving space 13. The flange 15 may provide an area in which the seeding cover 30, 60 covering the entrance of the receiving space 13 may be attached to the pod 1. That is, an edge of the protective paper may be attached to the flange 15 and be locked to the pod 1.

A grip part 16 may be extended from a fore end of the flange 15. The grip part 16 may be formed by being bent in a direction perpendicular to the flange 15. That is, the grip part 16 may be formed in a direction perpendicular to the base 11. The grip part 16 may be spaced apart from the sidewall 12 at a predetermined distance by the flange 15, so that the user can lift the pod 1 by putting a hand into a grip space 17 that is a space between the grip part 16 and the sidewall 12.

In addition, the grip part 16 and the base 11 may be perpendicular to each other and the sidewall 12 and the base 11 may be obtuse to each other, so that the grip space 17 may have a structure in which a sectional area is gradually widen as the grip space goes from the flange 15 to the base 11. Therefore, when the plurality of the pods 1 are stacked and a flange 15 of a relatively lower pod 1 is inserted into a grip space 17 of a relatively upper pod 1, the plurality of the pods 1 may be completely stacked due to thicknesses of the sidewall 12 and the grip part 16 and be stacked while each pod 1 may be spaced apart from each other at a predetermined distance. Accordingly, since the stacked pods 1 may be completely in close contact with each other, the pressure between the pods 1 may be maintained at atmospheric pressure, and since there is space for the user to hold the grip part 16, the stacked pods 1 may be easily separated from each other.

A plurality of seated protrusions 18 may be formed on the base 11 in the same direction as the protruding direction of the protrusion 14. That is, the seated protrusions 18 may be formed on a lower surface of the base 11 to support the pod 1. The seated protrusion 18 may support the pod 1 while reinforcing the strength of the base 11.

The medium 20, 50, 83 may be formed from soil (or artificial soil) containing various nutrients so as to facilitate seed germination and plant growth, and the soil may be mixed with peat moss, coco peat, etc. Whereby, the nutrient solution may not be mixed with supply water supplied to the medium 20, 50, 83 and thus the supply water may be prevented from being contaminated despite the long storage of the supply water.

In the medium 20, 50, 83, the soil may contain and be mixed with elements necessary for plant growth itself, and specifically, the medium 20, 50, 83 may contain a nutrient solution capsule (not shown) of a capsule type containing nutrients such as nitrogen, phosphorus, potassium, etc. necessary for plant growth therein. The nutrient solution capsule may have a water-soluble membrane (not shown), and when the absorption member 81 absorbs moisture and transfers the moisture to the medium 20, 50, 83, the nutrient solution capsule may dissolve and the nutrients therein may flow into the medium 20, 50, 83.

Plants may grow and require other nutrients. Therefore, various types of nutrient solution capsules containing different nutrients may be provided and the rate of dissolution in water may vary for each nutrient solution capsule. This may prevent unnecessarily oversupply of nutrients to plants. The rate of dissolution in water for each nutrient solution capsule may vary depending on the thickness or material of the water-soluble membrane.

Meanwhile, in the present disclosure, an open upper surface of the container 10 may be covered with the seeding cover 30, 60. The seeding cover 30, 60 may be provided in two types. In addition, depending on a type of the seeding cover 30, 60, a shape of the medium 20, 50, 83 received in the container 10 may also vary.

Furthermore, instead of the seeding cover 30, 60 covered on the container 10, the package 86, 87 to be described below may be covered directly on the pod 1. The configuration will be described in detail below.

First, a first embodiment of the pod 1 of the present disclosure will be described with reference to FIGS. 8 to 12.

A medium 20 may have a plurality of seeding holes 21. The seeding holes 21 may be provided to have various patterns. The medium 20 may have nine seeding holes 21. In particular, a total of the nine seeding holes 21 may form a pattern in which one seeding hole 21 positioned at a center of the medium 20, four seeding holes 21 positioned at centers of edges of the medium 20, and four seeding holes 21 positioned at positions corresponding to vertexes of the medium 20 are formed. The pattern of the seeding holes 21 may be provided in consideration of the type of plant to be cultivated and the minimum growth space between plants required for each plant type.

Each of the seeding holes 21 may include a seeding space 22 in which plant seeds are placed and a slope surface 23 provided at an edge of the seeding space 22 and guiding seeds to the seeding space 22. The seeding hole 21 may be configured such that the seeding space 22 is positioned at a lower side of the slope surface 23, that is, at a deep inside of the medium 20, so that seeds do not escape outside the seeding space 22 even when the seeds retain moisture and expand their volumes.

A seeding cover 30 may cover the open upper surface of the container 10. That is, the seeding cover 30 may be seated on the flange 15 and shield the entrance of the receiving space 13. The seeding cover 30 may have through holes 31 at positions corresponding to the seeding holes 21 formed on the medium 20. In particular, the seeding cover 30 may have a total of nine through holes 31, similar to the number of the seeding holes 21 of the medium 20, and the nine seeding holes 31 may have a pattern in which one through hole 31 positioned at a center of the seeding cover 30, four through holes 31 positioned at centers of edges of the seeding cover 30, and four through holes 31 positioned at positions corresponding to vertexes of the seeding cover 30 are formed.

The through holes 31 may have the same diameter as an outermost diameter of the slope surface 23. When seeds are planted in the medium 20 and a seed passes through one of the through holes 31, the seed may fall into the slope surface 23 of the medium 20, the slope surface 23 corresponding to the through hole 31, and the seed may move along the slope surface 23 and be seated in the seeding space 22, which may be a manufacturing advantage.

A guide slope surface 32 may also be provided at an edge of the through holes 31. That is, one surface of the seeding cover 30 may be depressed to be inclined toward the receiving space 13 to form the guide slope surface 32, and each of the through holes 31 may be formed on a fore end of the guide slope surface 32. The guide slope surface 32 may guide the seed to the through hole 31. Accordingly, the seed may be relatively easily seated in the seeding space 22.

Meanwhile, the through holes 31 and the seeding holes 21 may be positioned to correspond to each other, so that light by a lighting module 401, 402 may enter the seeding space 22.

A package 40 may be attached to an outer surface of the seeding cover 30. The package 40 may be a sheet paper or a thin plate-shaped extrudate. The package 40 may have guide holes 41. The guide holes 41 may be formed in positions corresponding to the through holes 31 of the seeding cover 30 and be formed in size corresponding to a diameter of the guide slope surface 32. However, since the guide holes 41 are partially formed, when the package 40 is attached to the outer surface of the seeding cover 30, a part of the through holes 31 may be shielded. The guide holes 41 of the package 40 may prevent a problem of insufficient nutrients or cultivation area due to excessive seeding in the medium 20, and provide optimal environment in which plants may be growth. Furthermore, the light of the lighting module 401, 402 may not be transmitted to positions of the medium 20 corresponding to the through holes shielded by the package 40. Accordingly, the environment in which plants may grow may be created only when the light is transmitted through the guide holes 41. The guide holes 41 of the package 40 may be formed to have different patterns depending on the type of seeds the user intends to plant.

Figure 12:
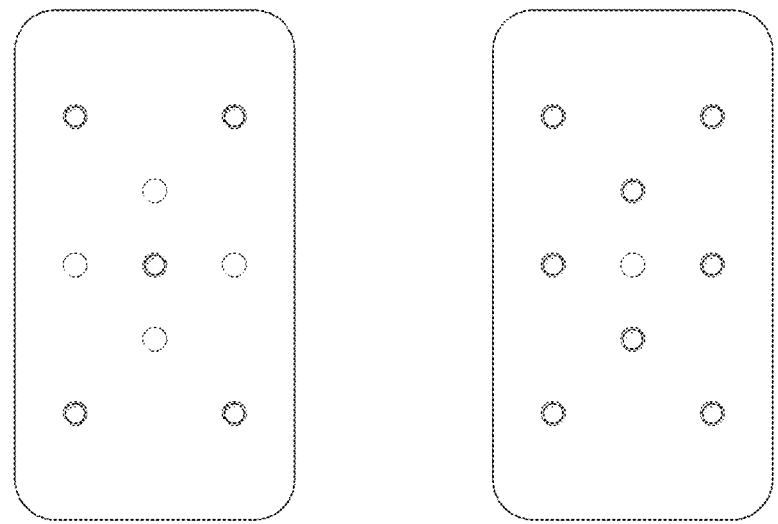
FIG. 12 is a perspective view showing a seed arrangement of the first embodiment of the pod according to the embodiment of the present disclosure.

In FIG. 12, a seed X 5 type in which seeds may be planted into the seeding holes excluding the centers of the edges of the medium 20, and a seed X 8 type in which seeds may be planted into all the seeding holes 21 excluding the center of the medium 20 are shown. When seeds are planted in the seed X 5 type and the seed X 8 type, the seeds may be seated in the seeding space 22 of the medium 20, as shown in FIG. 12.

Figure 13:
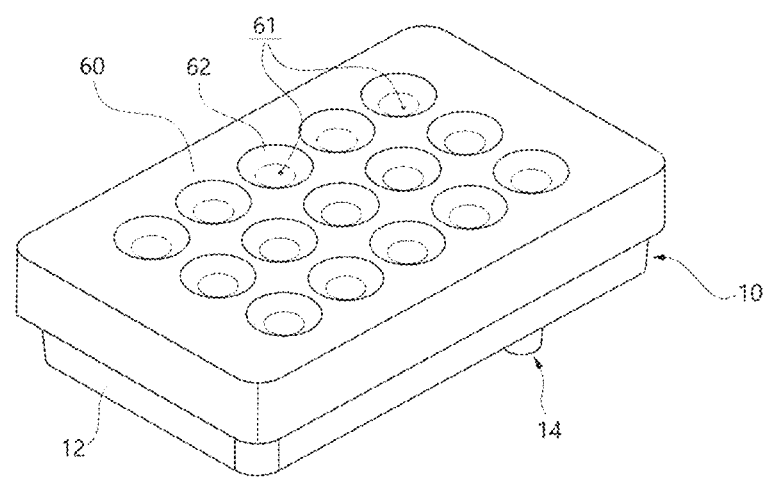
FIG. 13 is a perspective view showing a second embodiment of the pod according to the embodiment of the present disclosure.
Figure 14:
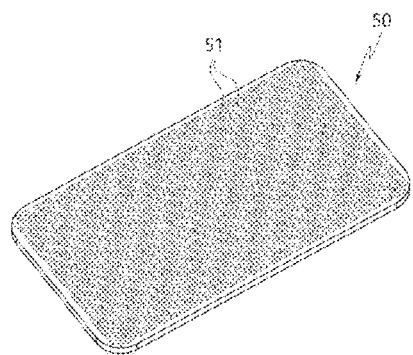
FIG. 14 is a perspective view showing a second embodiment of a medium of the pod according to the embodiment of the present disclosure.

Next, a second embodiment of the pod 1 of the present disclosure will be described with reference to FIGS. 13 to 15.

A medium 50 may have a plurality of seeding holes 51 formed in a mesh shape. The medium 50 may be made by compacting the soil. The medium 50 may be configured such that all of grids formed in the mesh shape may be used as the seeding holes 51. That is, entire surface of the medium 50 may be used as the seeding holes 51.

A seeding cover 60 may have a plurality of through holes 61 formed in rows and columns in a 3×5 arrangement on entire surface thereof. The number of the through holes 61 may not be limited to 3×5, and may be formed in a large number such as 4×6, 4×7, etc. A shape of the through holes 61 is the same as that of the first embodiment of the pod, so a redundant description will be omitted.

A package 70 may be attached to an outer surface of the seeding cover 60 of the second embodiment. A function of the package 70 of the second embodiment may be the same as that of the package 70 of the first embodiment. However, a variously-shaped pattern of guide holes 71 and an image 72 indicating a type of seed may be formed together on an outer surface of the package 70 of the second embodiment.

The image 72 may be a photograph or a drawing of a plant or a diagram schematically illustrating the plant, and may include letters expressing various kinds of languages. The user can see the image 72 and the pattern of the guide holes 71, and may determine what kind of plant will grow and required cultivation intervals.

Figure 15:
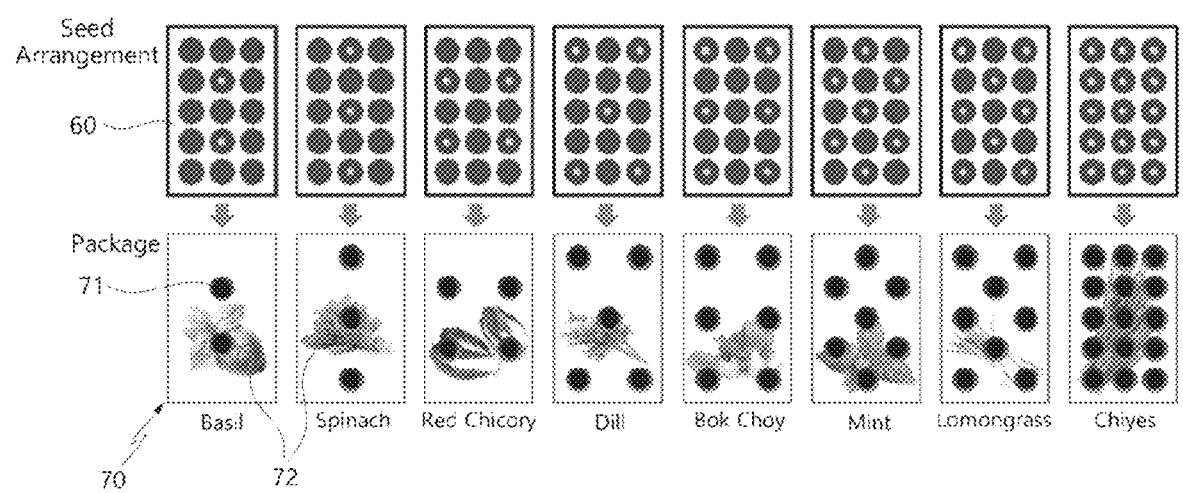
FIG. 15 is a schematic diagram showing the seed arrangement that is variable depending on an image of a package of the pod according to the embodiment of the present disclosure.

For example, referring to FIG. 15, in the case of basil occupying a relatively large cultivation area, an image 72 of basil and only two guide holes 71 may be formed together on the package 70 of the seeding cover 60. In the case of leek occupying a relatively small cultivation area, an image 72 of leek and guide holes 71 of the 3×5 arrangement may be formed together on the package 70 of the seeding cover 60.

In order to efficiently use the cultivation area of the medium 50, each of the guide holes 71 may be preferably arranged to be farthest apart from each other.

Figure 17:
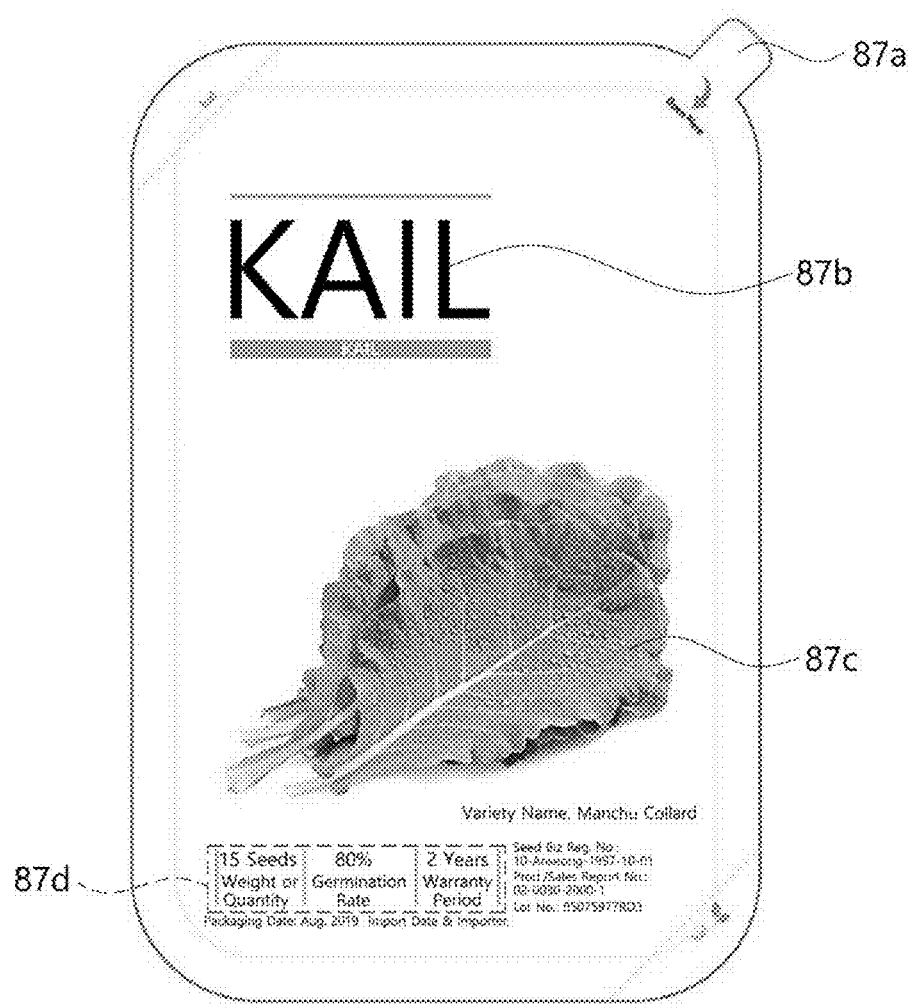
FIG. 17 is a top view showing a third embodiment of the package according to the embodiment of the present disclosure.
Figure 18:
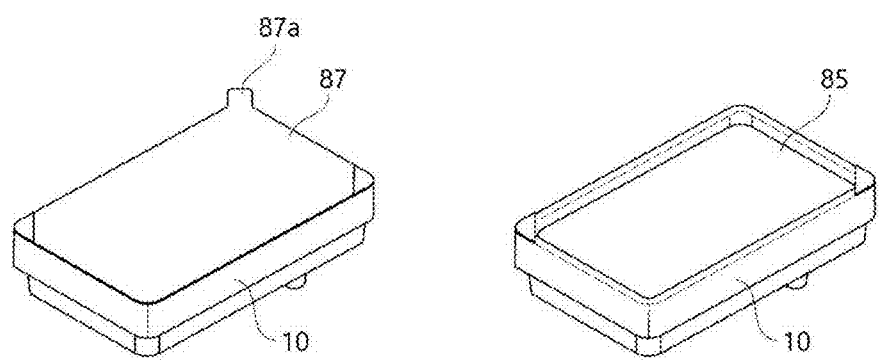
FIG. 18 is a perspective view showing before and after states of opening the package of the third embodiment of the pod according to the embodiment of the present disclosure.

Next, a third embodiment of the pod 1 of the present disclosure will be described with reference to FIGS. 16 to 18.

In the container 10, in addition to the absorption member 81 seated in the protrusion 14, a sheet-shaped absorbent paper 82 may be seated on a bottom surface of the base 11. The absorbent paper 82 may be configured to evenly distribute the external moisture absorbed through the absorption member 81 to a medium 83 seated in the container 10. Accordingly, the absorbent paper 82 may be seated over entire area of the base 11.

The medium 83 may be seated on an upper surface of the absorbent paper 82. The medium 83 may be the soil described above, and the nutrient solution capsule may be contained in the medium 83. When the absorption member 81 and the absorbent paper 82 absorb the external moisture and the moisture is transferred to the medium 83, the water-soluble membrane of the nutrient solution capsule may be dissolved and the nutrient solution contained therein may be supplied to the plant through the medium 83.

The seeds may be arranged on a seed paper 84 and seated on an upper surface of the medium 83 without being directly planted into the medium 83. The seed paper 84 may be manufactured in a sheet form in which powdered starch is compressed, and may hold the seeds not to move in the container 10. The seed paper 84 may be manufactured in a water-soluble form, and when water touches the seed paper 84, the seed paper 84 may be dissolved and the seeds may settle in the medium 83.

A brick 85 may be seated on an upper surface of the seed paper 84. The brick 85 may be manufactured in a plate shape corresponding to a sectional shape of the receiving space 13 of the container 10. The brick 85 may be made of an inorganic ore, also called vermiculite, which is processed into powder and then compressed. Vermiculite has innumerable fine pores, thus having excellent ventilation and easily controlling moisture of the soil. In addition, vermiculite may adsorb mold, so that mold growth may be prevented in the relatively humid cultivation room 121, 122.

Meanwhile, when the seeds in the medium 83 sprout and grow, plants grow through the brick 85. Accordingly, the brick 85 may be preferably compressed at a suitable intensity.

A package 86, 87 may be seated on an upper surface of the brick 85 in the receiving space 13 of the container 10. The package 86, 87 may be configured of two layers including an inner package 86 and an outer package 87.

The inner package 86 may fill an empty space in the receiving space 13 of the container 10 to prevent the internal components 81 to 85 seated in the container 10 from shaking or colliding with each other. The inner package 86 may be formed of a material capable of absorbing shock or formed to have an air layer therein so as to absorb internal vibration caused by external force and relieve the shock.

The outer package 87 may be seated on an upper surface of the inner package 86. In particular, the outer package 87 may be a sheet paper of a thin membrane like a film, and may be attached to the flange 15 of the container 10 and shield the entrance of the receiving space 13.

A tab 87a may protrude from an edge of the outer package 87. The tab 87a may be formed of the same material as the outer package 87. The user can remove the outer package 87 from the container 10 by pulling the tab 87a.

The outer package 87 may be provided at an outer surface of the pod 1, thereby providing plant information visually to the user. At least one of letter image 87b and plant image 87c may be printed on the outer package 87 and may provide information on the plant in the pod 1 to the user together with plant information 87d.

The letter image 87b may include letters expressing various types of languages. The letter image 87b may be configured of combination of one or more languages, and may be expressed in only one language.

The plant image 87c may be a photograph and a drawing of the plant planted in the pod 1 or a diagram schematically illustrating the plant. The plant image 87c may be used interchangeably with letter image 87b to help the user understand the plant. The letter image 87b and the plant image 87c may be preferably used by being printed together on the outer package 87.

The plant information 87d may communicate information on the rate of seed germination, estimated weight when the plant is harvested, the number of seeds, etc. In the plant information 87d, in addition to the information on the plant, term of germination warranty for quality guarantee, importer, retailer, packaging date, etc. may be further indicated.

The user can remove the outer package 87 and the inner package 86 of the pod 1 in order, and place the pod 1 with the brick 85 exposed outward on the bed 300. Whereby, the plant may be fully ready to grow.

Next, the cabinet 100 will be described with reference to FIGS. 1 to 3.

The cabinet 100 may be a part that provides the exterior of the plant cultivation apparatus.

The cabinet 100 may be formed in a container body that is open forward, and include an outer casing 110 providing an outer wall surface thereof and an inner casing 120 providing an inner wall surface.

Herein, the outer casing 110 may be formed in a container body that is closed at an upper surface thereof and open at a lower surface and a front surface thereof.

The inner casing 120 may be positioned in the outer casing 110 while being spaced apart from the outer casing 110. A foam insulation (not shown) may be filled between the inner casing 120 and the outer casing 110.

The cultivation room 121, 122 may be provided in the inner casing 120. The cultivation room 121, 122 may be a place where the plants are grown.

The cultivation room 121, 122 may include an upper cultivation room 121 and a lower cultivation room 122, and each of the two cultivation rooms 121 and 122 may be configured to have a separate cultivation space.

The cabinet 100 may have a door 130 at a front surface thereof.

The door 130 may be configured to open and close the cultivation room 121, 122 of the cabinet 100.

That is, as the door 130 is provided in the cabinet 100, the plant cultivation apparatus according to the embodiment of the present disclosure may be a closed-type cultivation apparatus. In particular, in the case of the closed-type cultivation apparatus, the plant cultivation apparatus may cultivate the plant while providing a sufficient amount of light and maintaining a predetermined temperature therein by a lighting module 401, 402, a circulation fan assembly 500, and a temperature control module 600, which will be described below.

Meanwhile, the door 130 may be one of a rotary type opening and closing structure and a sliding type opening and closing structure, and may be configured to block the front surface of the cabinet 100.

In the embodiment of the present disclosure, the door 130 may be configured as the rotary type opening and closing structure.

The door 130 may include a door frame 131 having a rectangular frame structure with an empty inside portion and a sight glass 132 blocking the empty inside portion of the door frame 131.

Preferably, the sight glass 132 may be formed of a transparent material, for example, may be formed of glass.

When the sight glass 132 is formed of glass, a protecting film (not shown) may be attached on the glass. The protecting film may be a light shading film (partially shading) that minimizes the leakage of light from the cultivation room indoors.

Instead of the protecting film, the sight glass 132 may have a dark color, so that the leakage of light indoors may be minimized.

Further, the door 130 may be configured of only the sight glass 132 without the door frame 131.

Next, the machine chamber frame 200 will be described.

The machine chamber frame 200 may constitute a bottom portion of the plant cultivation apparatus according to the embodiment of the present disclosure.

As shown in FIG. 1, the machine chamber frame 200 may be extended from a lower portion of the outer casing 110. The machine chamber frame 200 may include a bottom plate 211 constituting a bottom of the machine chamber frame 200, side surface plates 212 constituting opposite side surfaces thereof, a rear surface plate 213 constituting a rear surface thereof, and an upper surface plate 214 constituting an upper surface thereof. That is, the machine chamber frame 200 may be formed in a box shaped structure that has an open front surface. The upper surface plate 214 may serve as a bottom of the cultivation room 121, 122 in the cabinet 100.

The machine chamber frame 200 may be configured such that the open lower surface of the outer casing 110 is placed thereon and is coupled thereto.

The machine chamber frame 200 and the inner casing 120 may be disposed to be spaced apart from each other. The side surface plates 212 and the rear surface plate 213 of the machine chamber frame 200 may be respectively configured to be connected to opposite side surfaces and a rear surface of the outer casing 110.

Figure 16:
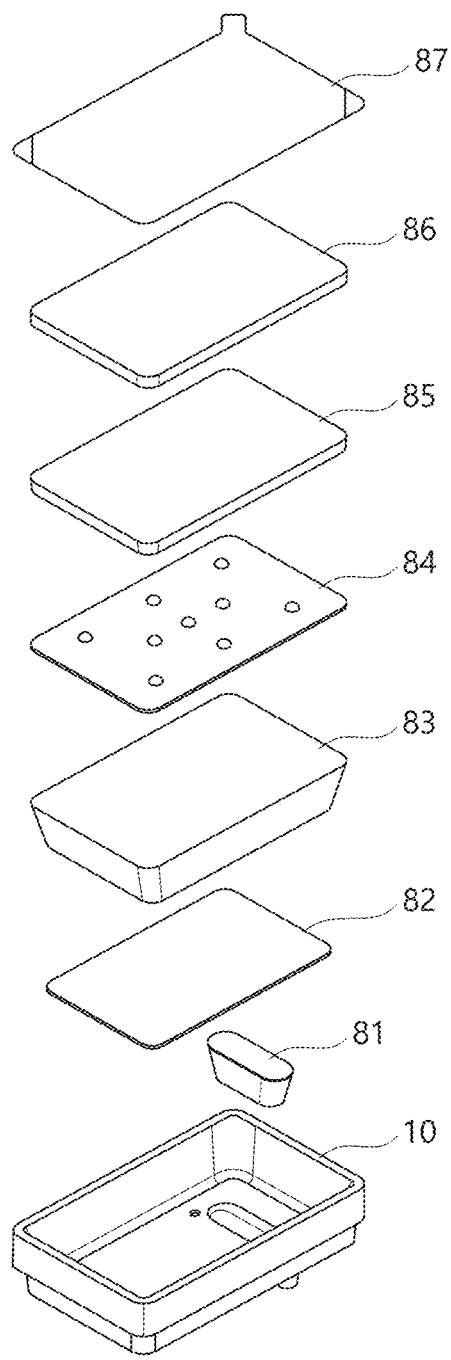
FIG. 16 is an exploded-perspective view showing a third embodiment of the pod according to the embodiment of the present disclosure.

Further, the inside of the machine chamber frame 200 may be configured as a machine chamber 201 (referring to FIG. 16).

That is, the machine chamber 201 and the cultivation room 121, 122 may be separately configured as a space in the machine chamber frame 200 and a space in the inner casing 120, respectively. The machine chamber 201 and the cultivation room 121, 122 may provide separate spaces.

A part of components of the temperature control module 600, which will be described below, may be provided in the machine chamber 201.

Although not shown in the drawings, the inner casing 120 and the machine chamber frame 200 may be formed in a singly body. In this case, a separate partition may be provided between the cultivation room 121, 122 and the machine chamber 201, so that the cultivation room 121, 122 and the machine chamber 201 may have separate spaces.

Further, an intake and exhaust grill 220 may be provided on the open front surface of the machine chamber frame 200 that is the front of the machine chamber 201. That is, the intake and exhaust grill 220 may serve to guide air flow suctioned from the indoor into the machine chamber 201 or air flow discharged from the machine chamber 201 to the indoor, and may serve to block an open front surface of the machine chamber 201.

In addition, the intake and exhaust grill 220 may have an inlet 221 and an outlet 222. The inlet 221 and the outlet 222 may be separated from each other by being arranged at positions divided by a partition 230, which will be described below. In the embodiment of the present disclosure, the inlet 221 and the outlet 222 may be defined as the inlet 221 at the left and the outlet 222 at the right, when viewed from the front of the plant cultivation apparatus. The above configuration is as shown in FIGS. 1 and 2.

Further, the partition 230 dividing the inside of the machine chamber 201 into left and right sides may be provided in the machine chamber frame 200. That is, flow paths through which air flows into and is discharged from the machine chamber 201 may be divided by the partition 230.

A flow path through which air flows into the machine chamber 201 may be a space at the side where the inlet 221 of the intake and exhaust grill 220 is positioned, and a flow path through which air is discharged from the machine chamber 201 may be a space at the side where the outlet 222 thereof may be positioned.

In addition, the spaces of the opposite sides in the machine chamber 201 which are divided by the partition 230 may be configured to communicate with each other at rear portions of the opposite side spaces. That is, a rear end portion of the partition 230 may be spaced apart from a rear wall surface in the machine chamber 201 without contacting therewith, so that the divided opposite side spaces may communicate with each other.

Although not shown in the drawings, an open hole (not shown) may be provided in the rear end portion of the partition 230 to allow the opposite side spaces in the machine chamber 201 to communicate with each other.

Further, the partition 230 may be formed in a straight line shape, and may be formed in an inclined structure or a bent structure. In the embodiment of the present disclosure, the partition 230 is formed in the bent structure. That is, the partition 230 is partially bent, so that an installation part of a condenser 620 and a compressor 610, which will be described later, may be secured sufficiently larger than other parts.

Further, a condensed water reservoir 240 may be provided in the machine chamber 201 of the machine chamber frame 200. The condensed water reservoir 240 that is described above may be positioned at a bottom at the side where air flows into the machine chamber 201 through the inlet 221, and may serve to receive condensed water flowing down from the condenser 620 and to fix the condenser 620 in the machine chamber 201.

Further, a heat exhaust opening 202 may be formed by penetrating the rear surface plate 213 of the machine chamber frame 200. The heat exhaust opening 202 may be a hole provided to discharge (or suction) air dissipating heat of a compressor 610, which will be described below. That is, through additional provision of the heat exhaust opening 202, the discharge of air may be efficiently performed.

The bottom plate 211 of the machine chamber frame 200 may have a discharge hole 203 (not shown) that is provided to discharge the air dissipating heat of the compressor 610.

Meanwhile, a rear portion of the upper surface plate 214 providing the upper surface of the machine chamber frame 200 may be formed to protrude upward more than other portions thereof, so that the rear portion of the inside of the machine chamber 201 may have a space higher than other portions thereof. That is, considering a protruding height of the compressor 610 provided in the machine chamber 201, the rear portion of the machine chamber 201 may be formed higher than the other portions thereof.

Further, a controller 20 (referring to FIG. 16) may be provided at a front space of a portion between an upper surface of the upper surface plate 214 and a lower surface of the inner casing 120, the lower surface thereof facing the upper surface of the upper surface plate 214, the controller 20 being provided to control operation of each component of the plant cultivation apparatus. A circuit board having various control circuits may constitute the controller 20.

In particular, the machine chamber 201 and the cultivation room 121, 122 may be configured to communicate with each other by a communication path 250. The communication path 250 may be formed in a tube body having a first end penetrating through the upper surface plate 214 and a second end penetrating a bottom surface of the inner casing 120.

That is, part of air in the machine chamber 201 may be supplied into the cultivation room 121, 122 through the communication path 250.

Next, the bed 300 will be described with reference to FIGS. 21 to 27.

The bed 300 may be a part provided to place the pod 1 thereon.

The bed 300 may be formed in a tray structure of a flat plate or having a circumferential wall, and may be configured to store supply water in an upper surface thereof.

In particular, first guide rails 101 may be respectively provided on opposite wall surfaces (opposite wall surfaces in the inner casing) in the cultivation room 121, 122. The first guide rails 101 may guide the bed 300 to be moved back and forth so that the bed 300 may be ejected from the cultivation room 121, 122 in a drawer manner.

Guide ends 301 may be provided on opposite wall surfaces of the bed 300. The guide ends 301 may be configured to be supported by the first guide rails 101, so that the bed 300 may be ejected from the cultivation room 121, 122 in the drawer manner. Although not shown in the drawings, the bed 300 may be configured to be ejected in the drawer manner by other various structures.

Further, a water reservoir 310 may be provided at a rear surface of the bed 300. The water reservoir 310 may be configured to receive the supply water from the outside of the bed 300 and supply the supply water into the bed 300.

The water reservoir 310 may be formed by protruding rearward from any one side portion of the rear surface of the bed 300. In addition, the water reservoir 310 may have a bottom surface formed in a downward concave shape and may be configured to guide the supply water to flow into a communication portion with a water supply flow path 330, which will be described below.

In addition, a depression 320 depressed from a bottom of the bed 300 may be formed at a center portion in the bed 300. The water supply flow path 330 may be configured to guide the supply water supplied into the water reservoir 310 to be supplied into the depression 320.

Herein, the water supply flow path 330 may be formed in a groove reaching from the water reservoir 310 to the depression 320. Although not shown in the drawings, the water supply flow path 330 may be configured of a pipe or a hose that is separated from the bed 300.

In particular, the water supply flow path 330 may be configured as an inclined structure or a round structure that is gradually (or sequentially) inclined downward as the water supply flow path 330 goes from the water reservoir 310 to the depression 320. That is, the above-described inclined or round structure may allow the supply water to be rapidly supplied and prevent the supply water supplied into the depression 320 from overflowing to the water reservoir 310.

In addition, on opposite sides of the water supply flow path 330, bank parts 331 provided to precisely guide the supply water may be provided. That is, the bank parts 331 may be configured to allow the supply water supplied along the water supply flow path 330 to be efficiently supplied to the depression 320 without overflowing the water supply flow path 330.

Further, at a center portion on the depression 320, a dam part 340 may be formed by protruding upward on a surface of the depression 320. The dam part 340 may be formed in a long protrusion that is long in a left and right direction of the bed 300. Based on the dam part 340, the depression 320 may be divided into a front depression 321 and a rear depression 322.

That is, when a plurality of pods 10 is respectively seated in rows of front and rear portions of the bed 300, front row pods 10 may be arranged such that the protrusion 12 of each of the front row pods is positioned rearward and is in contact with the front depression 321, and rear row pods 10 may be arranged such that the protrusion 12 of each of the rear row pods is positioned forward and is in contact with the rear depression 322.

In particular, the dam part 340 may be formed by protruding upward from a bottom of the depression 320, thus the supply water does not remain therein, and the dam part 340 may serve to guide the supply water to be precisely supplied to a portion where the protrusion 12 of the pod 1 is positioned.

Further, on the bottom surface of the depression 320, a flow guidance groove 302 may be provided in a portion of communicating with the second water supply flow path 330.

That is, the supply water flowing along the second water supply flow path 330 may be guided by the flow guidance groove 302 in the process of flowing into the depression 320 to flow from one side of the depression 320 to another side thereof.

In addition, a sensing protrusion 323 may be formed by protruding on the bottom surface of the depression 320. An upper surface of the sensing protrusion 323 may be positioned higher than the bottom surface in the depression 320 and positioned lower than the bottom surface of the bed 300.

A plurality of beds 300 may be provided. In this case, the beds 300 may be vertically spaced apart from each other in the cultivation room 121, 122. Although not shown in the drawings, each of the beds 300 may be installed to be spaced apart from each other in a direction of left and right.

A vertical distance between the beds 300 may be set differently depending on the sizes in the cultivation rooms 121 and 122 or the type of plant to be cultivated. For example, as the first guide rails 101 provided on the opposite wall surfaces in the cultivation room 121, 122 are configured to be adjusted in vertical position, the vertical distance between the beds 300 may be adjusted as needed.

Further, the bed 300 may have a bed cover 350.

The bed cover 350 may be a part on which each pod 1 is seated to be positioned in its original position. A plurality of seating depressions 351 and 352 provided for seating of each pod 1 may be formed on an upper surface of the bed cover 350.

Each of the seating depressions 351 and 352 may have a width roughly equal to a width of the pod 1 and be formed by being depressed at a depth sufficient to partially receive the pod 1. The bed cover 350 may be formed of a metal material and, in particular, it is preferable that the bed cover 350 is formed of stainless steel to prevent corrosion. The bed 300 may be formed of acrylonitrile, butadiene, and styrene (ABS) resin.

In addition, a penetration hole 351a, 352a may be provided in each of the seating depressions 351 and 352 so that the protrusion 12 of the pod 1 may penetrate the penetration hole 351a, 352a. That is, the user can place the pod 1 in its original position by checking a position of the penetration hole 351a, 352a and a position of the protrusion 12.

In particular, the seating depressions 351 and 352 may be divided into a front row seating depression 351 on which each of the front row pods 10 is seated and a rear row seating depression 352 on which each of the rear row pods 10 is seated. A penetration hole 351a of the front row seating depression 351 and a penetration hole 352a of the rear row seating depression 352 may be arranged adjacent to each other. That is, when the bed cover 350 is seated on the bed 300, the penetration holes 351a and 352a may be respectively positioned at the front depression 321 and the rear depression 322 of the bed 300.

Further, a handle 360 may be provided in a front surface of the bed 300. The user can eject or retract the bed 300 in the drawer manner by using the handle 360.

A front surface of the handle 360 may be configured not to be in contact with an inside surface of the door 130, thus a gap may be provided between the front surface of the handle 360 and the door 130. That is, through the gap, air may flow between the upper cultivation room 121 and the lower cultivation room 122, and air flowing in the lower cultivation room 122 may be discharged indoors.

Through the flow of air through the gap described above, condensation may be prevented from forming on surface of the door 130.

Next, the lighting module 401, 402 will be described with reference to FIGS. 29 to 32.

The lighting module 401, 402 may be a part emitting light to the pod 1 seated on the bed 300 in the cultivation room 121, 122. That is, as the lighting module 401, 402 is provided in the plant cultivation apparatus, the closed-type plant cultivation apparatus may continue to provide light to the plant.

In the embodiment, the lighting module 401, 402 may be a light emitting diode (LED) 421 and be configured to emit light.

To this end, the lighting module 401, 402 may include a lighting case 410 constituting an outside appearance of the lighting module 401, 402, a circuit board 420 in which the LED 421 is embedded, and the lighting cover 430 covering the lighting case 410.

The lighting case 410 may be a part where the circuit board 420 is provided.

In addition, the lighting case 410 may have a plurality of lighting holes 411.

The circuit board 420 may be fixed on an upper surface of the lighting case 410.

The LED 421 embedded in the circuit board 420 may be arranged to emit light through each of the lighting holes 411 of the lighting case 410.

Further, the lighting cover 430 may be coupled to the lighting case 410 to block a lower surface of the lighting case 410, and may be exposed to the inside of the cultivation room 121, 122. Therefore, the lighting cover 430 may be a portion that may protect the circuit board 420 from moisture in the cultivation room 121, 122.

It is preferable that a surface of the lighting cover 430 is coated or surface-processed for the diffusion of light. Thus, light emitted from the LED 421 may be uniformly dispersed to entire portions in the cultivation room 121, 122 without being focused on one portion.

In addition, an upper surface of the lighting case 410 may be installed to be surrounded by an upper cover 460.

Meanwhile, in order to separately provide the cultivation room 121, 122 in the inner casing 120 into upper and lower cultivation rooms, the lighting module 401, 402 may be separately provided into an upper lighting module 401 provided at an upper wall surface in the inner casing 120, and a lower lighting module 402 installed to cross between the upper cultivation room 121 and the lower cultivation room 122 and emitting light source to the lower cultivation room 122.

That is, since the second lighting module 402 may serve as a partition vertically dividing the two cultivation rooms 121 and 122, there may not be necessary to provide a separate partition. Accordingly, each of the cultivation rooms 121 and 122 may be secured as large as possible.

The second lighting module 402 may be configured such that a rear end thereof is fixed to a fan guide 520 of the circulation fan assembly 500, which will be described below.

Furthermore, a residual water detection sensor 440 may be provided on an upper surface of the second lighting module 402. The residual water detection sensor 440 may serve to detect residual water remaining in the depression 320 of the bed 300 received in the upper cultivation room.

In particular, the residual water detection sensor 440 may be positioned inside a portion where the sensing protrusion 323 is formed, in the lower portion of the second bed 300. The residual water detection sensor 440 may detect whether or not the residual water remains on the upper surface of the sensing protrusion 323 to determine the residual water in the depression 320.

The residual water detection sensor 440 may be configured of a capacitance-type sensor and accurately detect the residual water in the depression 320.

The residual water detection sensor 440 may also be configured in other methods not shown in the drawings. For example, the second residual water detection sensor 440 may be configured as a mechanical sensor such as a floating method or an electronic sensor using two electrodes.

A temperature sensor 450 may be provided on the upper surface of the second lighting module 402. The temperature sensor 450 may serve to detect the temperature in the cultivation room 121, 122 to allow the air temperature by the temperature control module 600 to be controlled.

Next, the circulation fan assembly 500 will be described with reference to FIGS. 1, 16, 18, and 33.

The circulation fan assembly 500 may be configured to circulate air in the cultivation room 121, 122.

The circulation fan assembly 500 may be provided in rear space in the cultivation room 121, 122, in the entire space in the cabinet 100. That is, due to the air circulation in the cultivation room 121, 122 by the operation of the circulation fan assembly 500, the inside of the cultivation room 121, 122 may be in a negative pressure state. Accordingly, part of air in the inside of the machine chamber 201 may flow into the inside in the cultivation room 121, 122 through the communication path 250 communicating with the inside of the cultivation room 121, 122 and the inside of the machine chamber 201, and may be supplied as air circulating in the cultivation room 121, 122.

Meanwhile, the circulation fan assembly 500 may be provided for each of the cultivation rooms 121 and 122, or may be configured as the single circulation fan assembly 500 to control air circulation for all the cultivation rooms 121 and 122.

In the embodiment of the present disclosure, the circulation fan assembly 500 may be provided for each of the cultivation rooms 121 and 122. That is, the air circulations in the cultivation rooms 121 and 122 may be performed equally or separately by the circulation fan assemblies 500, respectively.

When the air circulation is separately controlled for each of the cultivation rooms 121 and 122, plants that require different types of cultivation environments may be simultaneously cultivated for each of the cultivation rooms 121 and 122.

The circulation fan assembly 500 may include a circulation fan 510, the fan guide 520, and a partition wall 530.

The circulation fan 510 may be operated for blowing air. The circulation fan 510 may be configured as a radial flow fan suctioning air in a shaft direction thereof and blowing the air in a radial direction thereof.

Furthermore, the fan guide 520 may be a part that guides a flow of air blown by the circulation fan 510 as the circulation fan 510 is provided.

The fan guide 520 may have an installation hole 521 formed by penetrating the fan guide 520, the installation hole 521 being provided to receive the circulation fan 510. The fan guide 520 may have an air guide 522 at a front surface thereof, the air guide 522 guiding air suctioned through the circulation fan 510 from a rear space in the cabinet 100 to flow into the cultivation room 121, 122. The air guide 522 may be configured to guide air blown in the radial direction of the circulation fan 510 to flow to an upper space in the cultivation room 121, 122.

Further, the partition wall 530 may be a part that is positioned at the front of the fan guide 520 and blocks the fan guide 520 from the cultivation room 121, 122.

That is, the partition wall 530 may protect the circulation fan 510 from the inside of the cultivation room 121, 122.

A lower portion of the partition wall 530 may be open to the inside of the cultivation room 121, 122. Thus, air flowing in the cultivation room 121, 122 may flow through the open lower portion of the partition wall 530 to the rear space in the cabinet 100 and then be heat-exchanged with an evaporator 630 positioned in the rear space. Continuously, the air may be supplied to the upper space in the cultivation room 121, 122 by a blowing force of the circulation fan 510 and guidance of the fan guide 520, the above circulation of air may be repeated.

In particular, opposite side surfaces of the partition wall 530 may be fixed to the opposite wall surfaces or the rear wall surface in the inner casing 120. The fan guide 520 may be provided on the partition wall 530.

Figure 19:
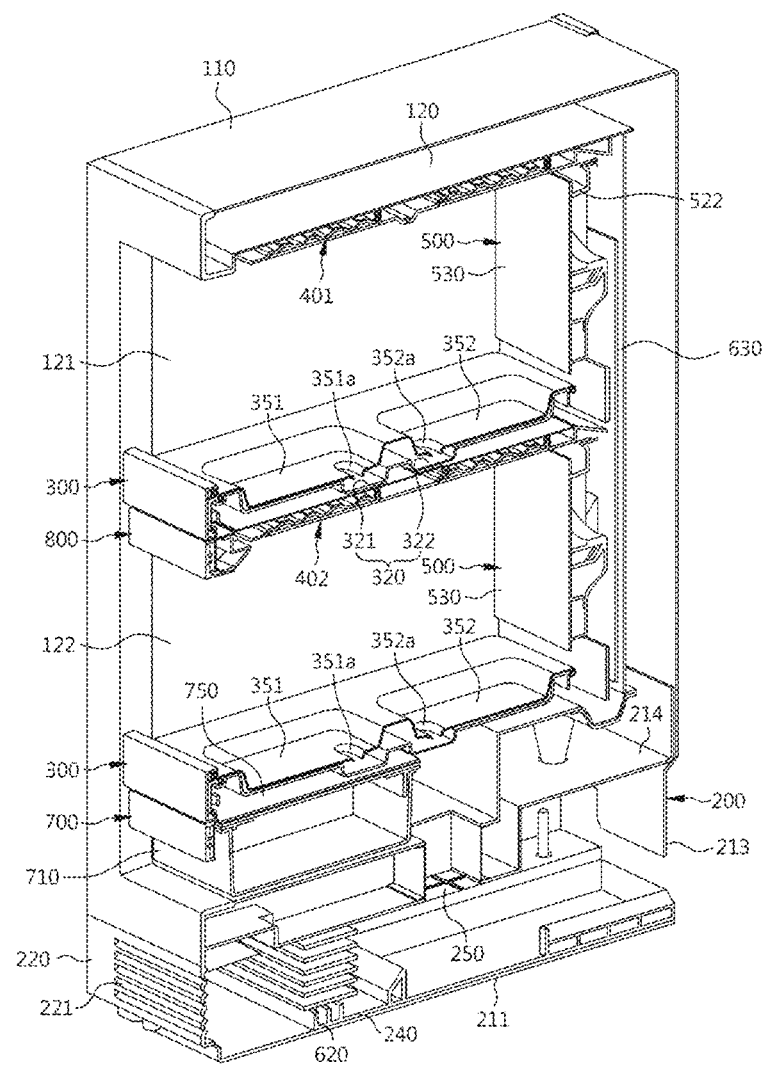
FIG. 19 is a sectioned-perspective view showing an internal structure of the plant cultivation apparatus according to the embodiment of the present disclosure.
Figure 20:
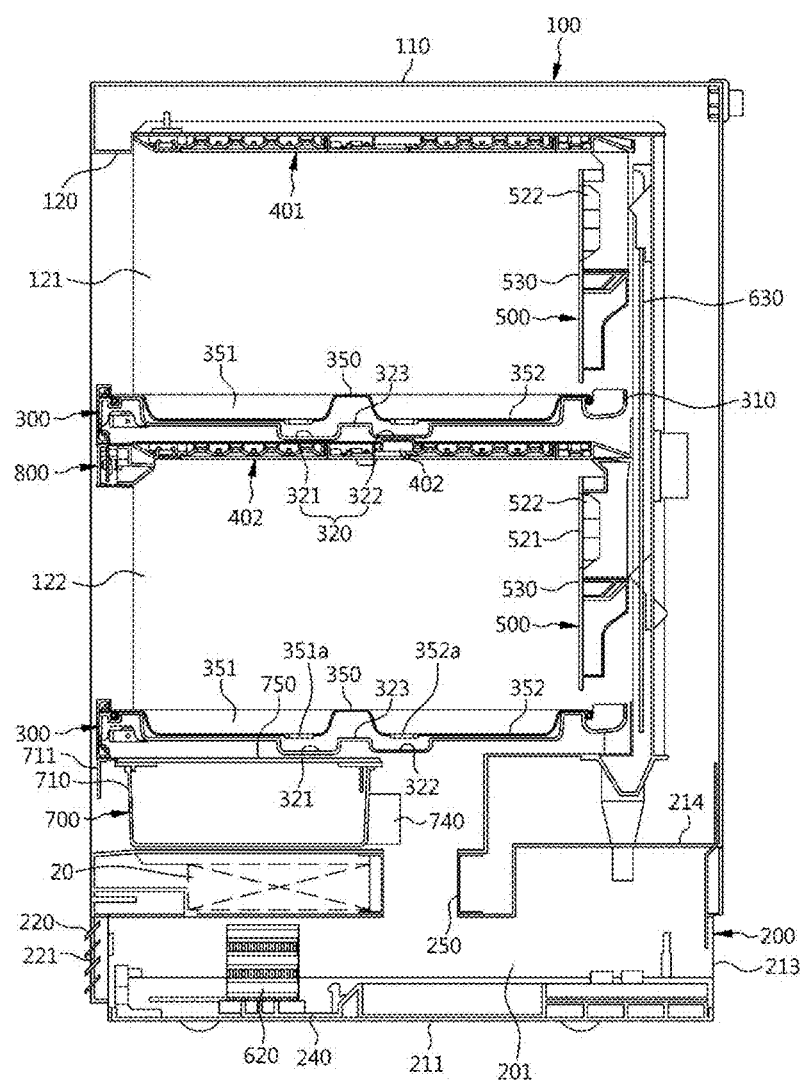
FIG. 20 is a side section view showing the plant cultivation apparatus according to the embodiment of the present disclosure.
Figure 21:
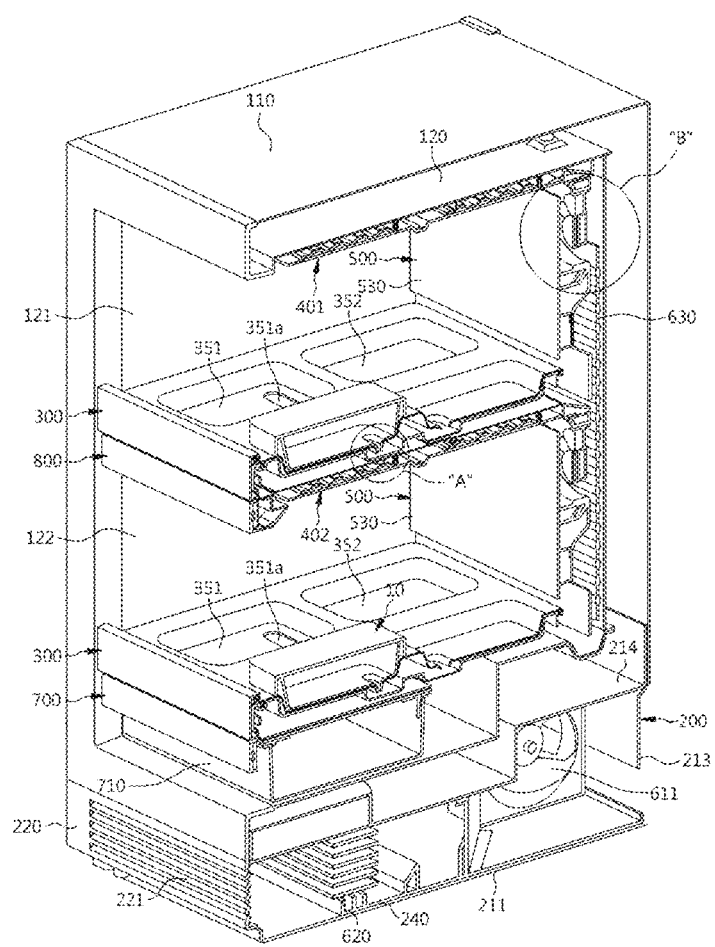
FIG. 21 is a sectioned-perspective view showing the internal structure of the plant cultivation apparatus according to the embodiment of the present disclosure, the view shows a sectioned portion different from FIG. 6.
Figure 22:
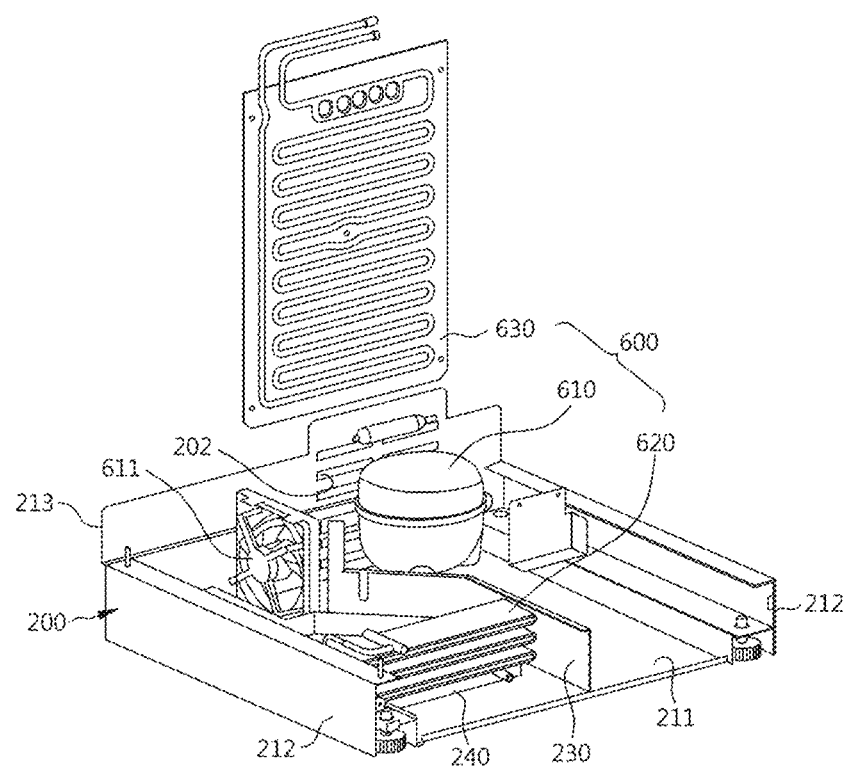
FIG. 22 is a perspective view showing an internal structure of a machine chamber of the plant cultivation apparatus according to the embodiment of the present disclosure.
Figure 23:
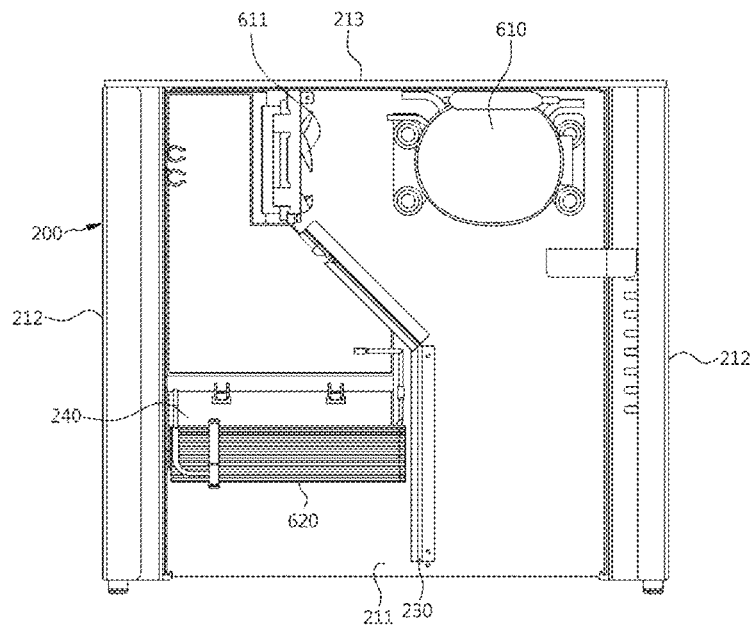
FIG. 23 is a plan view showing an internal structure of a machine chamber of the plant cultivation apparatus according to the embodiment of the present disclosure.
Figure 24:
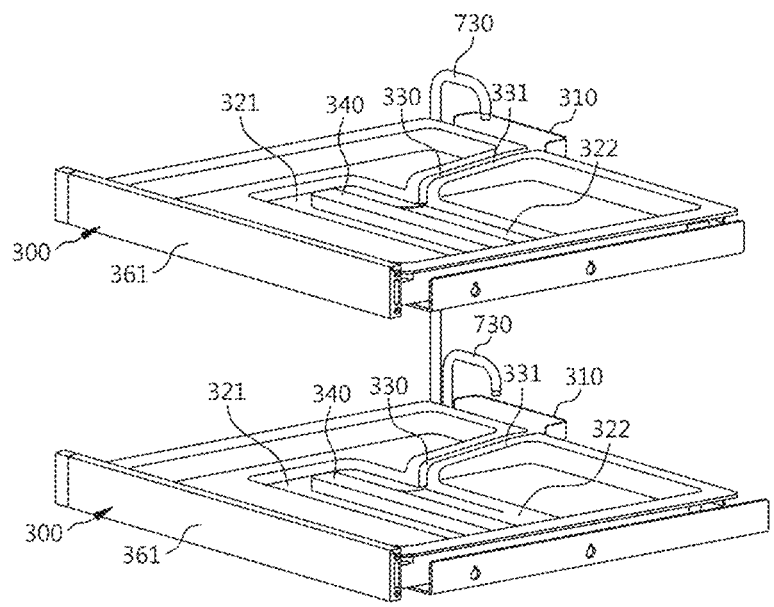
FIG. 24 is a perspective view showing a bed of the plant cultivation apparatus according to the embodiment of the present disclosure.
Figure 25:
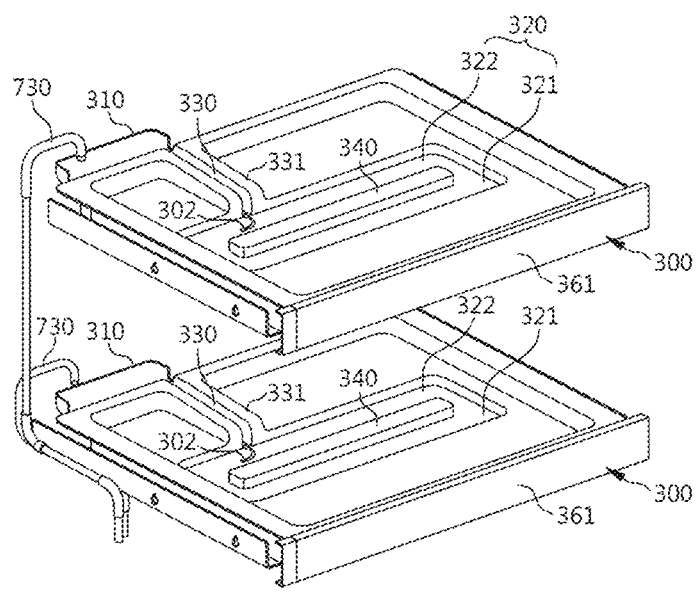
FIG. 25 is a perspective view from another angle, the view showing the bed of the plant cultivation apparatus according to the embodiment of the present disclosure.
Figure 26:
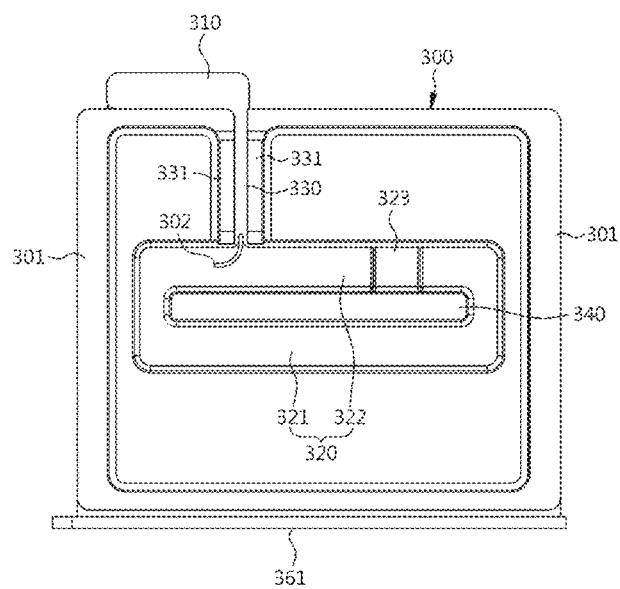
FIG. 26 is a plan view showing the bed of the plant cultivation apparatus according to the embodiment of the present disclosure.
Figure 27:
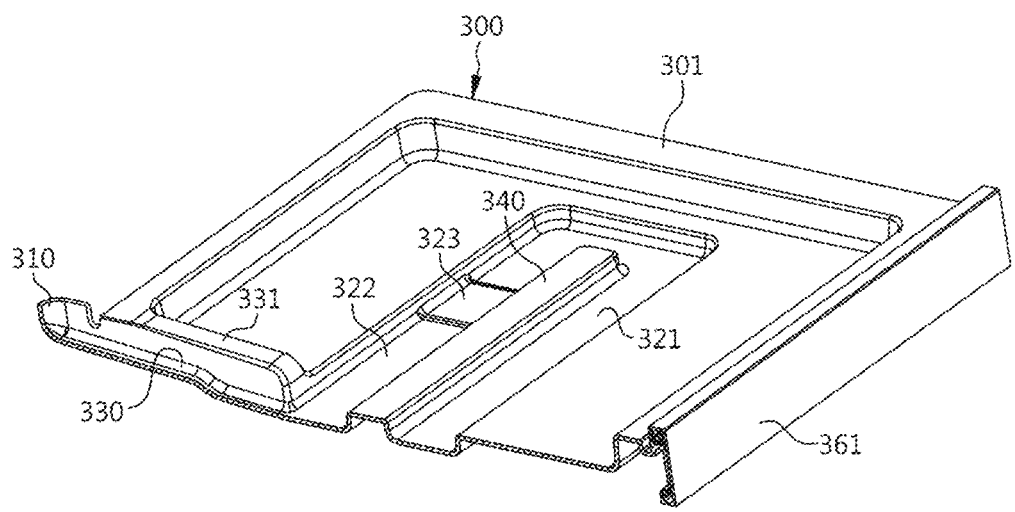
FIG. 27 is a sectioned-perspective view showing the bed of the plant cultivation apparatus according to the embodiment of the present disclosure.
Figure 28:
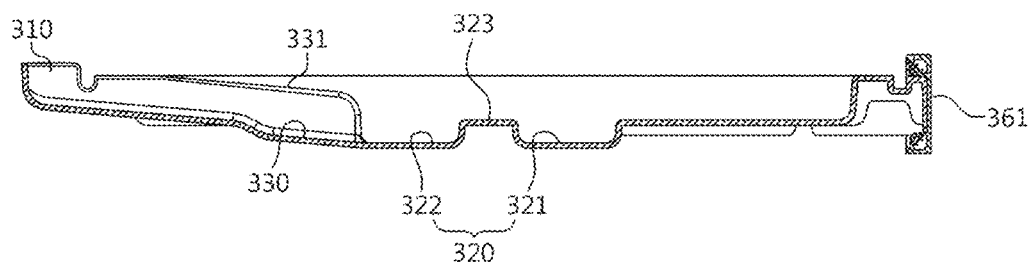
FIG. 28 is a side section view showing the bed of the plant cultivation apparatus according to the embodiment of the present disclosure.
Figure 29:
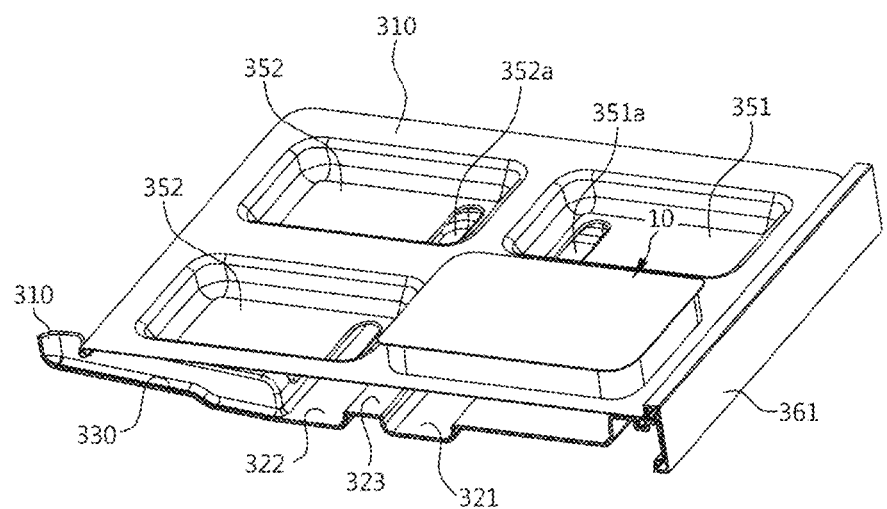
FIG. 29 a sectioned-perspective view showing a coupled state between the bed, a bed cover, and the pod of the plant cultivation apparatus according to the embodiment of the present disclosure.
Figure 30:
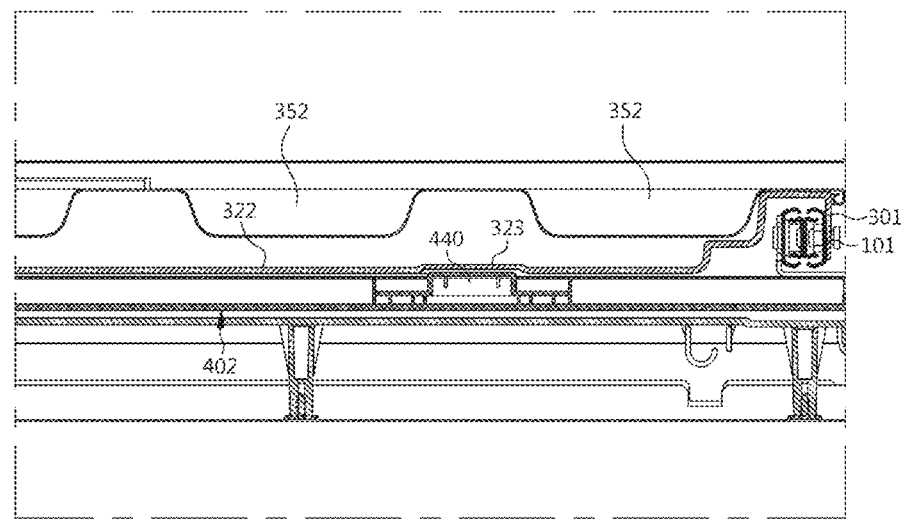
FIG. 30 is a main part section view from the front, the view showing an installation state of the bed of the plant cultivation apparatus according to the embodiment of the present disclosure.
Figure 31:
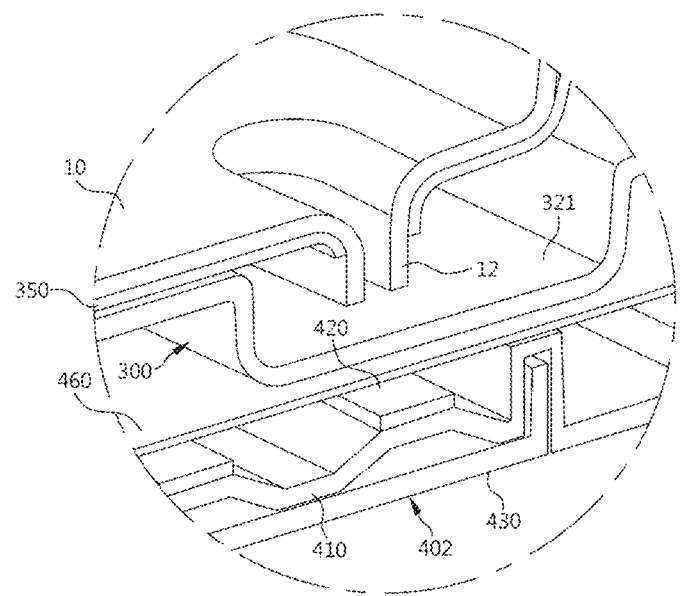
FIG. 31 is an enlarged view of part "A" in FIG. 8.
Figure 32:
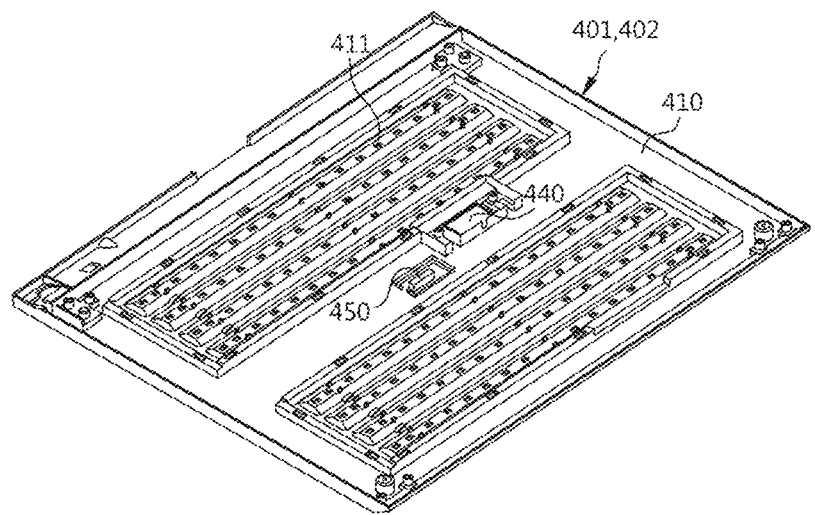
FIG. 32 is a perspective view showing a lighting module of the plant cultivation apparatus according to the embodiment of the present disclosure, the view taken from the top of the lighting module.
Figure 33:
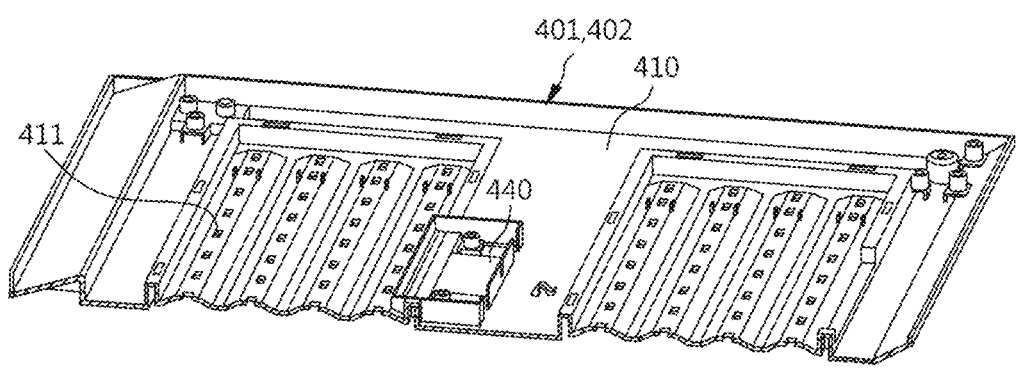
FIG. 33 is a perspective view showing a partially cut lighting module of the plant cultivation apparatus according to the embodiment of the present disclosure.
Figure 34:
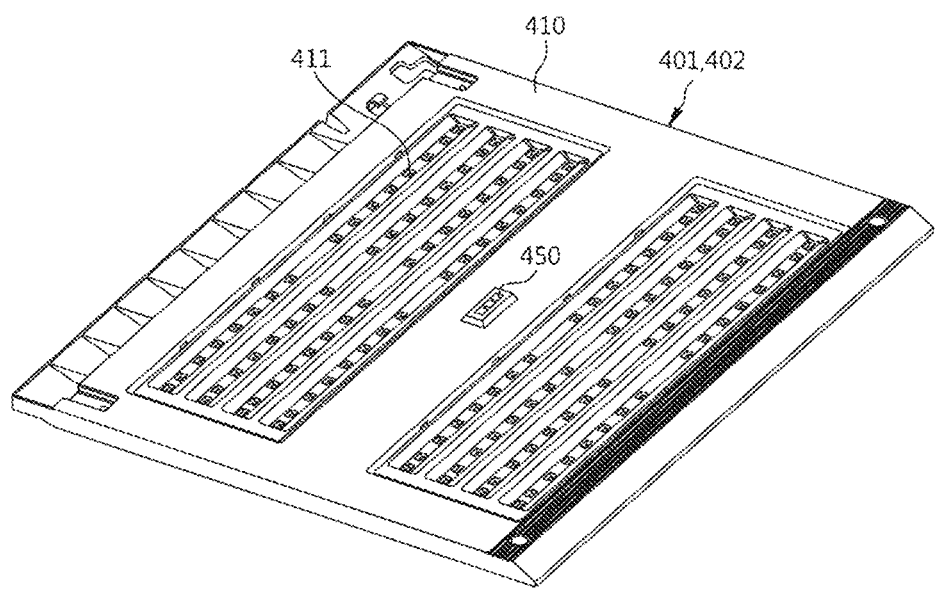
FIG. 34 is perspective view showing the lighting module of the plant cultivation apparatus according to the embodiment of the present disclosure, the view taken from a lower side of the lighting module.
Figure 35:
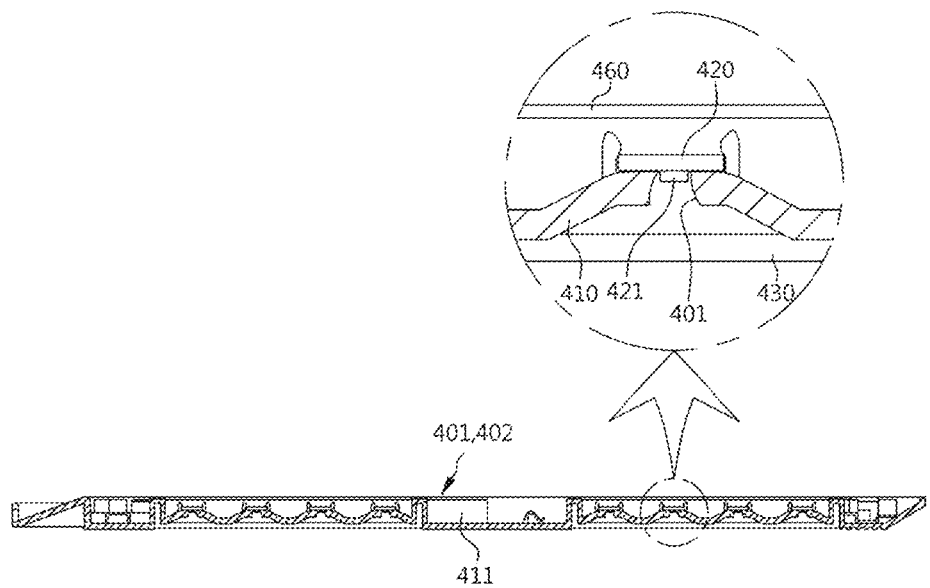
FIG. 35 is a section view showing the lighting module of the plant cultivation apparatus according to the embodiment of the present disclosure.
Figure 36:
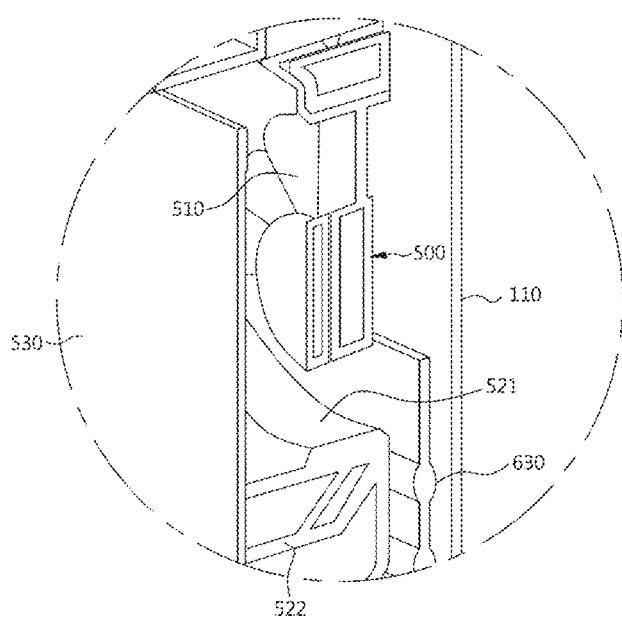
FIG. 36 is an enlarge view of part "B" in FIG. 8, the view showing a circulation fan assembly of the plant cultivation apparatus according to the embodiment of the present disclosure.
Figure 37:
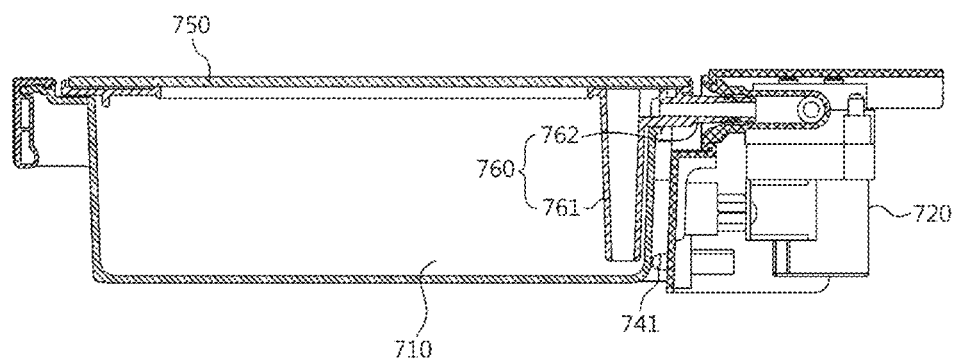
FIG. 37 is a side view showing a state in which an opening and closing cover of a water supply module is opened in the plant cultivation apparatus according to the embodiment of the present disclosure.

Next, the temperature control module 600 will be described with reference to FIGS. 18 to 20.

The temperature control module 600 may be a configuration for controlling the temperature of air circulating in the cultivation room 121, 122 of the inner casing 120.

The temperature control module 600 may include a freezing system including the compressor 610, the condenser 620, and the evaporator 630. That is, the temperature control of the air circulated in the cultivation room 121, 122 may be performed by the freezing system.

The compressor 610 and the condenser 620 may be provided in the machine chamber 201 in the machine chamber frame 200.

The condenser 620 may be positioned in a space at an air inflow side of the two spaces divided into opposite sides by the partition 230 in the machine chamber frame 200. The compressor 610 may be positioned at a portion where the air passing through the condenser 620 passes. In particular, the compressor 610 may be positioned in a space at an air outflow side of the two spaces divided by the partition 230 in the machine chamber frame 200.

The above structure may be configured to allow the air flowing into the machine chamber 201 of the machine chamber frame 200 to pass through the condenser 620 by priority. That is, considering that the compressor 610 is the configuration generating a great quantity of heat, when the temperature control module 600 may be configured such that air passes through the compressor 610 and then is heat-exchanged with the condenser 620, heat exchange efficiency may be reduced. Accordingly, the temperature control module 600 may be preferably configured such that air passes through the condenser 620 before the compressor 610.

In addition, the condenser 620 may be positioned at the front space in the machine chamber 201, and the compressor 610 may be positioned at a rear space in the machine chamber 201.

The structure may be provided to maximally divide positions of the compressor 610 and the condenser 620 and to separate the compressor 610 from the condenser 620, so that the effect of the high temperature heat of the compressor 610 on the condenser 620 may be reduced.

A Cooling fan 611 may be provided in an air inflow side of the compressor 610, that is, a rear portion of the partition 230, so that air may flow into and be discharged from the machine chamber 201 and dissipate heat of the compressor 610. The cooling fan 611 may serve to block a space where the compressor 610 is positioned from an air inflow side space where the condenser 620 is positioned, in the rear portion of the partition 230. Therefore, effect of high temperature heat of the compressor 610 on the condenser 620 may be reduced.

Furthermore, the evaporator 630 may be arranged in a rear space of the circulation fan assembly 500, in each portion in the inner casing 120. That is, air in the machine chamber 201 introduced into a lower space in the inner casing 120 through the communication path 250 may be introduced along a gap between the bottom surface in the inner casing 120 and the bed 300 positioned in the inner casing 120 to a rear space in the inner casing 120. Then, the air may be heat-exchanged while passing through the evaporator 630 and then may be blown into the cultivation room 121, 122 through the circulation fan assembly 500.

The evaporator 630 may be a plate shaped evaporator so as to be stably installed in the rear space in the inner casing 120 and improve heat exchange performance even when the apparatus is located in a narrow place.

Meanwhile, the temperature control module 600 may have an electric heater. That is, when a plant that lives in a higher temperature environment than the normal indoor environment is cultivated, the electric heater may be used to cultivate the plant.

Next, the water supply module 700 will be described with reference to FIGS. 34 to 37.

The water supply module 700 may be configured to supply the supply water to the bed 300.

In the embodiment of the present disclosure, the water supply module 700 may be configured to pump a required amount of water to the bed 300 when the water supply is needed in a state of storing the supply water in advance.

That is, the conventional cultivation apparatus does not use the method of supplying a required amount of the supply water, but use a method of storing enough supply water in a water storage and supplying the stored supply water to soil by using an absorbing member. Herein, the supply water may be mixed with a nutrient solution, so that a problem with contamination of the supply water may occur.

However, in the embodiment of the present disclosure, as nutrients may be contained in the medium of the pod 1 and the pod 1 may receive a required amount of supply water, residual water may be prevented from existing in portions other than a water tank 710, so that odor due to contamination of the supply water may be fundamentally prevented.

The water supply module 700 may include the water tank 710, a water pump 720, and a supply hose 730.

The water tank 710 may be a part in which the supply water is stored.

The water tank 710 may be formed in a rectangular box structure that is open at an upper portion thereof, and be positioned between a bottom surface of the inner casing 120 and the bed 300. That is, considering that a gap is provided between the bottom surface of the inner casing 120 and the bed 300 because the upper surface plate 214 of the machine chamber frame 200 partially protrudes upward due to the height of the compressor 610 in the machine chamber 201, the water tank 710 may be positioned in the gap, so that the cultivation space in the cultivation room 121, 122 may be sufficiently secured.

In particular, the water tank 710 may be positioned at a front space in the cabinet 100 and be provided to be drawable forward from the cabinet 100. That is, considering that the rear portion of the machine chamber 201 is formed to be higher than the other portion due to the height of the compressor 610, the water tank 710 may be provided in a front portion of a lower portion in the inner casing 120 which is provided due to the upward protruding portion of the machine chamber 201. On the opposite sidewall surfaces of the cabinet 100, second guide rails 102 may be provided to guide back and forth movement of the water tank 710.

In addition, the water tank 710 may be configured to be exposed to the indoor when the door 130 is opened. That is, the door 130 may be configured to block not only the cultivation room 121, 122 but also the water tank 710, so that the water tank 710 may be exposed outward when the door 130 is opened. Thereby, the user can easily eject the water tank 710 and replenish the supply water.

The water tank 710 may have a handle 711 at a front surface thereof, and the user can eject and retract the water tank 710 by using the handle 711 in the drawer manner.

In particular, the handle 711 of the water tank 710 may be also configured not to contact the door 130 like the handle 360 of the bed 300. Thus, a gap may be provided between a front surface of the handle 711 and the door 130.

Next, the water pump 720 may be a part pumping the supply water in the water tank 710.

The water pump 720 may be positioned at a rear space of a portion where the water tank 710 is installed, in the lower space in the inner casing 120.

In particular, an installation frame 740 may be provided between the water tank 710 and the water pump 720, and the water pump 720 may be fixed on a rear surface of the installation frame 740. That is, when the water tank 710 is ejected, the installation frame 740 may prevent the water pump 720 from being exposed outward and allow the water pump 720 to be fixed in its original position.

Further, a sensing part 741 detecting whether or not the water tank 710 is ejected may be provided on a front surface of the installation frame 740. The sensing part 741 may be configured of a proximity sensor, and when the water tank 710 is closer to the sensing part 741, the sensing part 741 may determine that the water tank 710 is retracted in the plant cultivation apparatus. The sensing part 741 may be configured of various detecting devices, such as a touch switch.

In addition, a residual water detection sensor 742 may be provided at an upper surface of the installation frame 740. The residual water detection sensor 742 may detect residual water remaining in the depression 320 of the bed 300 positioned above the installation frame 740.

In particular, the residual water detection sensor 742 may be positioned inside a portion where the sensing protrusion 323 is provided, in a lower portion of the bed 300 and sense whether or not the residual water remains on the upper surface of the sensing protrusion 323 to determine the residual water in the depression 320.

The residual water detection sensor 742 may be configured of a capacitance-type sensor and may accurately detect the residual water in the depression 320.

The residual water detection sensor 742 may be configured of other methods not shown in the drawings. For example, the residual water detection sensor 742 may be configured as a mechanical sensor, such as a floating method or an electronic sensor using two electrodes.

In addition, a residual water detection sensor 743 may be additionally provided on the front surface of the installation frame 740. The residual water detection sensor 743 provided on the front surface of the installation frame 740 may serve to check whether or not the supply water remains in the water tank 710.

Next, the supply hose 730 may be a connection hose supplying the supply water pumped by the water pump 720 to the bed 300.

The supply hose 730 may be provided such that a first end thereof is connected to the water pump 720 and a second end thereof is positioned directly above the water reservoir 310 of the bed 300.

Meanwhile, the open upper surface of the water tank 710 constituting the water supply module 700 may be configured to be opened and closed by an opening and closing cover 750.

In addition, the opening and closing cover 750 may be provided with a water supply connection tube 760 that is connected to the water pump 720 to supply the supply water stored in the water tank 710 to the water pump 720. That is, the water pump 720 may not be configured to be directly coupled to the water tank 710, but be configured to be selectively connected thereto by the water supply connection tube 760. Whereby, only the water tank 710 may be ejected from the cabinet 100.

The water supply connection tube 760 may include an inlet tube 761 and a connection tube 762, the inlet tube 761 protruding from a lower surface of a rear side of the opening and closing cover 750 into the water tank 710, and the connection tube 762 being extended toward a rear surface of an upper end of the inlet tube 761 and connected to the water pump 720. That is, when the water tank 710 is retracted in the plant cultivation apparatus, while the connection tube 762 is connected to the water pump 720, the supply water in the water tank 710 may be pumped into the supply hose 730 by the pumping operation of the water pump 720. Further, when the water tank 710 is ejected from the plant cultivation apparatus, the connection tube 762 may be separated from the water pump 720.

In particular, it is preferably that the inlet tube 761 protrudes to the bottom in the water tank 710, so that the supplementing cycle of the supply water in the water tank 710 may be delayed as much as possible.

Meanwhile, non-described reference numeral 745 may be a water level detection sensor detecting water level of the supply water in the water tank 710.

Meanwhile, the plant cultivation apparatus according to the embodiment of the present disclosure may include the display module 800.

The display module 800 may be configured to display each condition of the plant cultivation apparatus and to perform various controls.

Each condition displayed through the display module 800 may be the temperature in the cultivation room 121, 122, cultivation time, operational states.

Further, the display module 800 may be configured to be operated in a touchable manner, or may be configured to be operated by a button or a switch.

In particular, the display module 800 may be provided in the cabinet 100 or in the door 130.

However, when the display module 800 is provided in the door 130, the connection structure of various signal lines or power lines may be inevitably complicated.

Considering the above problem, the display module 800 may be preferably provided in the cabinet 100.

Moreover, considering that the sight glass 132 constituting the inside portion of the door 130 may be formed of a transparent material such as glass, the display module 800 may be preferably provided in the front of the first lighting module 401 among the lighting modules 401 and 402.

Hereinbelow, the operation of the plant cultivation apparatus according to the embodiment of the present disclosure will be described in detail for each process.

First, a provision process of the pod 1 will be described.

When the pod 1 is newly provided in the plant cultivation apparatus, the user can open the door 130, and eject the entire bed 300 positioned in the cultivation room 121, 122 while the cultivation room 121, 122 of the inner casing 120 is opened.

The bed 300 may be slidingly moved along the first guide rails 101 and ejected from the cultivation room 121, 122 in the inner casing 120. The bed 300 may not be ejected completely, but be ejected only to the point where the pod 1 is easily seated without discomfort.

In this state, the protection film (not shown) of the prepared pod 1 may be removed and then the pod 1 may be seated on the seating depression 351, 352 of the bed cover 350.

The pod 1 may be arranged such that the protrusion 12 provided in the lower surface thereof is positioned to match with the penetration hole 351a, 352a formed in the seating depression 351, 352. Thus, the pod 1 may be seated on the bed cover 350 in the state of being partially received in the seating depression 351, 352.

When a pods 10 where plant cultivation is completed is in the seating depression 351, 352 of the bed cover 350, the pod 1 with completed cultivation may be removed from the bed cover 350 and then a new pod 1 may be seated on the seating depression 351, 352.

Then, when the seating of the pod 1 is completed, the bed 300 may be pushed and retracted into the cultivation room 121, 122.

The above operation may be performed about at least one or all of a bed 300 of the upper cultivation room 121 and a bed 300 of the lower cultivation room 122 sequentially or selectively.

Next, the cultivation process will be described.

As described above, when the pod 1 is provided in the bed 300 in the cultivation room 121, 122, for germination of seeds planted in the pod 1 or for cultivation of germinated seeds in the pod 1, maintenance of temperature, provision of light, and supply of the supply water suitable for the germination and cultivation should be performed.

The control may be performed with a program set by default in the controller 20, and may be individually designated by the user.

In the embodiment of the present disclosure, the control may be automatically performed based on the program set by default. The program may vary in response to the type of plant or cultivation method.

The above-described control may be performed by manipulating the display module 800.

That is, when the cultivation operation is performed by manipulating the display module 800 in the state in which the bed 300 provided with the pod 1 is provided in the cultivation room 121, 122, the controller 20 may control the temperature control module 600, the circulation fan assembly 500, the lighting module 401, 402, and the water supply module 700 to automatically cultivate the plant.

When the operation of the temperature control module 600 is controlled, the cooling fan 611 and the freezing system including the compressor 610, the condenser 620, and the evaporator 630 may be operated to perform freezing operation.

Figure 38:
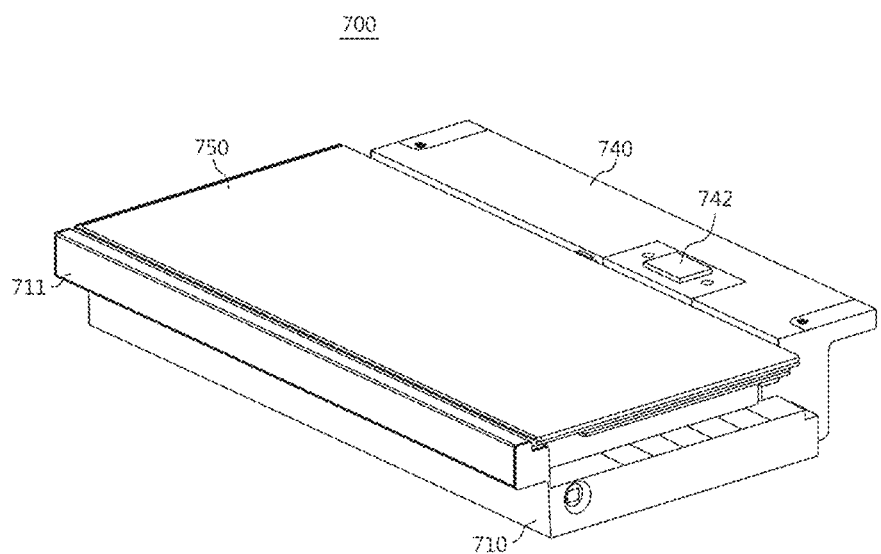
FIG. 38 is a perspective view showing a state in which a water tank and an installation frame of the water supply module of the plant cultivation apparatus according to the embodiment of the present disclosure are coupled to each other.

In particular, when the freezing operation is performed, indoor air may be suctioned into the machine chamber through the inlet 221 of the intake and exhaust grill 220 provided on the open front surface of the machine chamber, and the air passing through the machine chamber may be discharged through the outlet 222 of the intake and exhaust grill 220. The indoor air suctioned into the inlet 221 may perform heat exchange and heat dissipation while passing through the condenser 620, the cooling fan 611, and the compressor 610 and then be discharged indoors through the outlet 222. The above operation is as shown in FIG. 38.

In addition, when the freezing operation is performed, the circulation fan 510 constituting the circulation fan assembly 500 may be operated.

Figure 40:
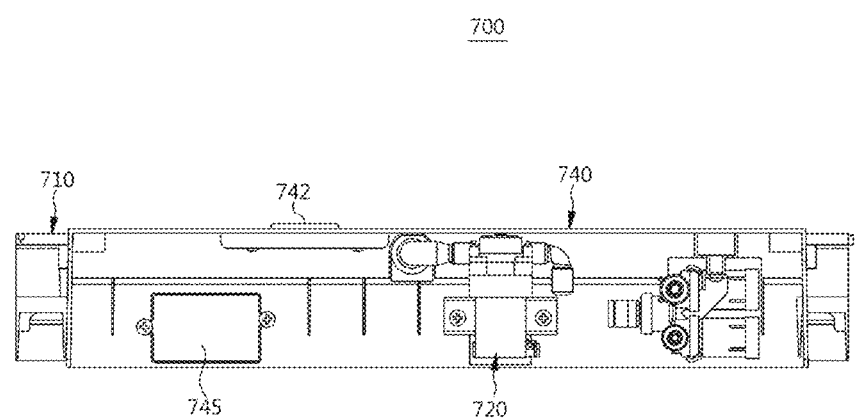
FIG. 40 is a rear view showing the state in which the water tank and the installation frame of the water supply module of the plant cultivation apparatus according to the embodiment of the present disclosure are coupled to each other.
Figure 41:
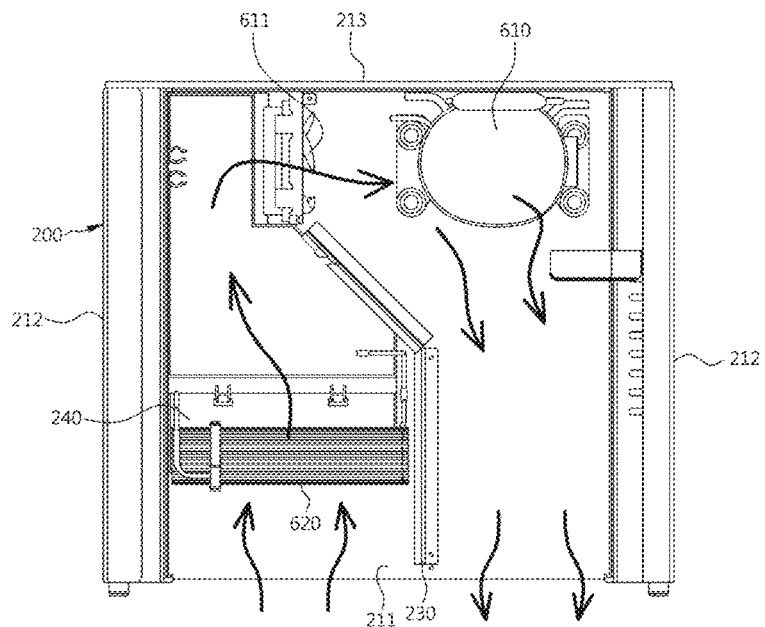
FIG. 41 is a plan view showing an air flow flowing into the machine chamber of the plant cultivation apparatus according to the embodiment of the present disclosure.
Figure 42:
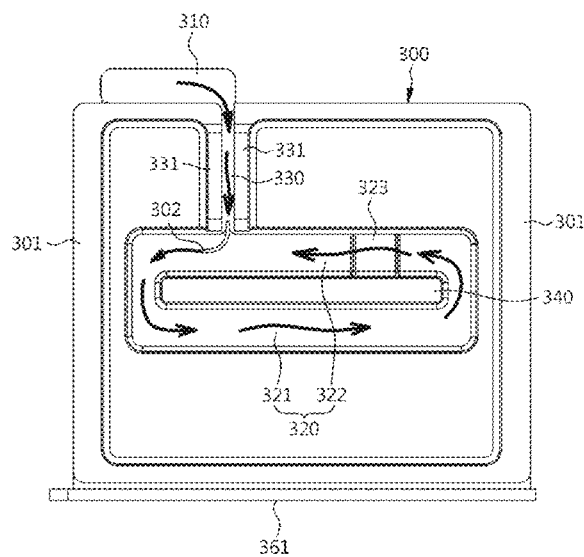
FIG. 42 is a plan view showing a state of supplying water to the inside of the bed of the plant cultivation apparatus according to the embodiment of the present disclosure.
Figure 43:
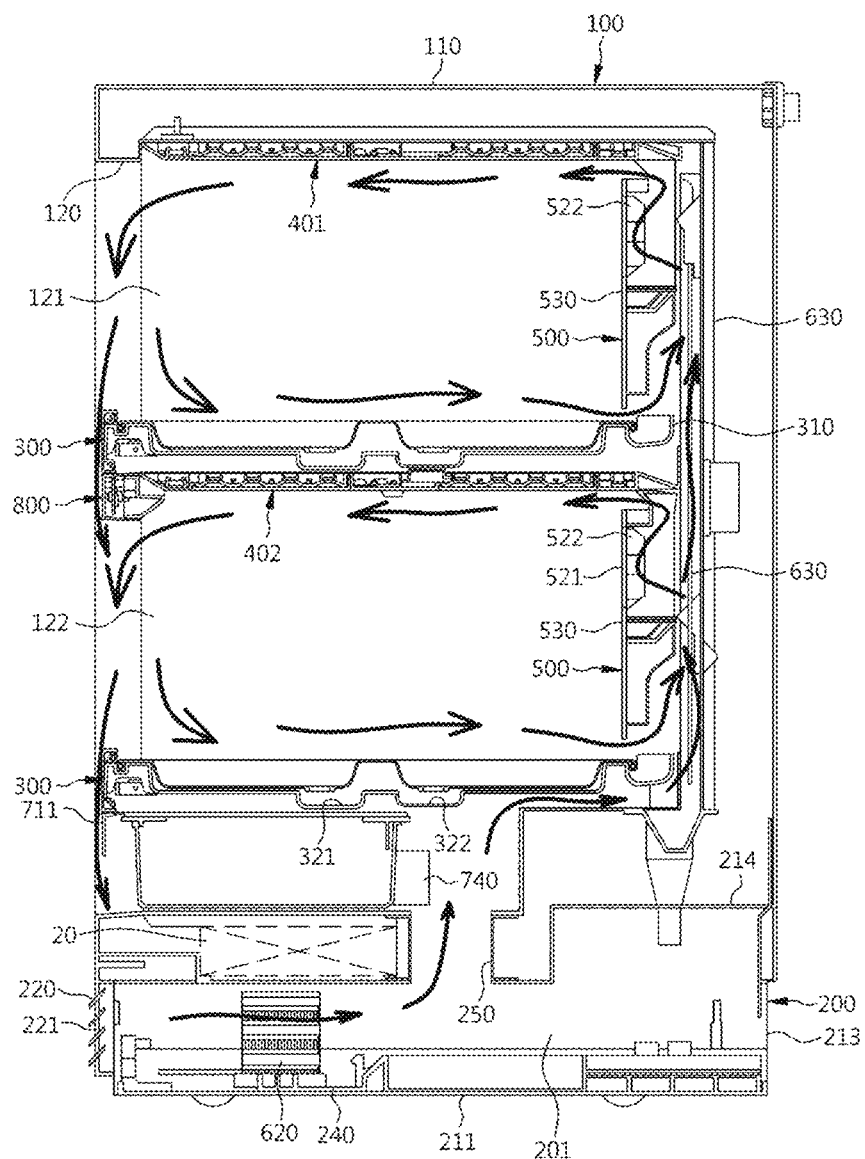
FIG. 43 is a section view showing an air flow flowing from the machine chamber to a cultivation room of the plant cultivation apparatus according to the embodiment of the present disclosure.

Accordingly, air remaining in the rear space in the inner casing 120 may pass through the circulation fan 510 and be supplied into the cultivation room 121, 122. In addition, the air may flow in the cultivation room 121, 122 and then flow to a portion where the rear space in the inner casing 120 through the open lower end of the partition wall 530 positioned in rear of the cultivation room 121, 122. Continuously, the air may be heat-exchanged with evaporator 630 positioned at the rear space and then be supplied into the cultivation room 121, 122 by the blowing of the circulation fan 510. As the above circulation is repeated, the temperature in the cultivation room 121, 122 may be controlled. The above operation is as shown in FIG. 40.

In particular, while air in the cultivation room 121, 122 repeatedly circulates by the operation of the circulation fan 510, the rear space in the inner casing 120, that is, the rear space of the cultivation room 121, 122, may be in relatively lower pressure state compared to the indoor (the outside of the plant cultivation apparatus).

Accordingly, due to the pressure difference, part of inside air flowing through the machine chamber 201 may flow into the lower space in the inner casing 120 through the communication path 250, and then flow into the rear space in the inner casing 120 along the gap between the bottom surface in the inner casing 120 and the bed 300. The air may be continuously heat-exchanged while passing through the evaporator 630 positioned in the rear space, and then may be supplied through the circulation fan assembly 500 into the upper space in the cultivation room 121, 122.

Accordingly, the air introduced into the cultivation room 121, 122 may flow through the inside of the cultivation room 121, 122 to keep the inside at a predetermined temperature, so that the cultivated plants may be cultivated in optimal temperature conditions.

Meanwhile, a part of the air circulated in the upper cultivation room 121 may pass through a gap between a front surface of the upper bed 300 and the door 130 and may flow into the lower cultivation room 122, and part of air circulated in the lower cultivation room 122 may pass through a gap between a front surface of the lower bed 300 and the door 130. Accordingly, condensation may be prevented on the surface of the door 130 by the flow of air passing through the gap.

Further, when the cultivation operation is performed, the operation of the lighting module 401, 402 may be also controlled.

By controlling the operation of the lighting module 401, 402, the LED 430 may be periodically lit (or continuously lit) and may provide light to the plants in the cultivation room 121, 122.

Even when the lighting module 401, 402 controls the LED 430 to emit light, as a protection film (or sight glass of dark color, not shown) of the sight glass 132 constituting the door 130 is provided, the inconvenience of the indoor user may be minimized by minimizing leakage of the light in the cultivation room 121, 122 indoors by the protecting film (not shown) of the sight glass 132 (or sight glass of dark color) constituting the door 130.

In addition, when the cultivation operation is performed, the operation control of the water supply module 700 may be performed periodically (or when necessary).

That is, when the cultivated plant and the water supply cycle of the plant are determined, the operation control of the water pump 720 may be performed for each water supply cycle. When the operation of the water pump 720 is controlled and the sensing part 741 detects that the water tank 710 is not in place, the water pump 720 may be controlled not to be operated.

Whereas, when the sensing part 741 detects that the water tank 710 exists, the water pump 720 may be operated to supply the supply water stored in the water tank 710 to each bed 300.

Then, the supply water may be pumped to the water pump 720 through the water supply connection tube 760, and be supplied through the supply hose 730 to the water reservoir 310 of each bed 300.

The supply water supplied to the water reservoir 310 may be supplied to the depression 320 in the bed 300 by guidance of the water supply flow path 330 connected to the water reservoir 310. Herein, since the bank parts 331 are formed by protruding at the opposite sides of the water supply flow path 330, the supply water may flow efficiently into the depression 320 along the water supply flow path 330.

Figure 39:
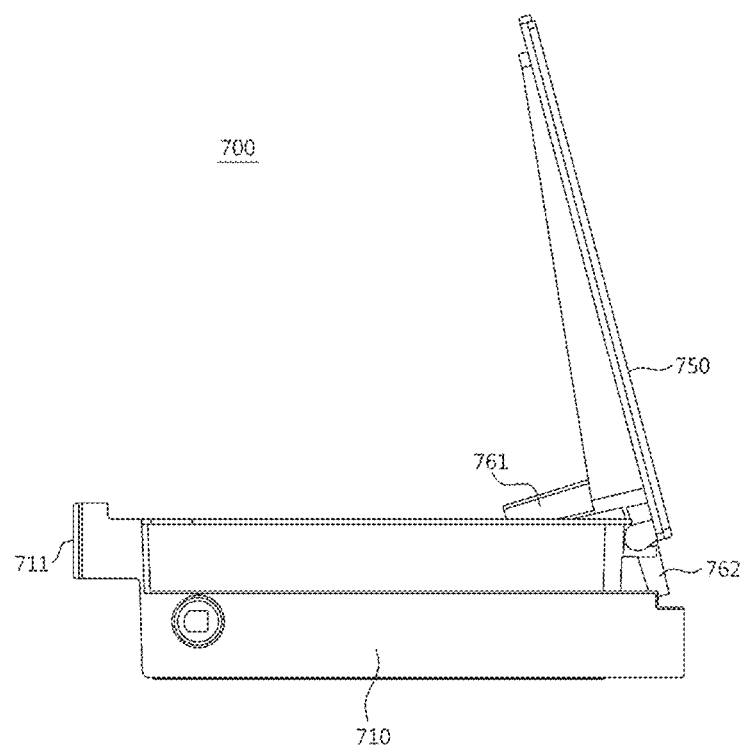
FIG. 39 is a section view showing the state in which the water tank and the installation frame of the water supply module of the plant cultivation apparatus according to the embodiment of the present disclosure are coupled to each other.

In particular, considering that the flow guidance groove 302 is provided in the communication portion between the water supply flow path 330 and the depression 320 and the depression 320 is formed in a track shaped structure, the supply water flowing into any one portion in the depression 320 by guidance of the water supply flow path 330 may flow from the one portion of the depression 320 to another portion thereof by guidance of the flow guidance groove 302 to be filled in the front water supply groove 321 and the rear water supply groove 322 in order. The above description is as shown in FIG. 39.

Further, the supply water filled in the depression 320 may be absorbed in the medium of the pod 1 through the protrusion 12 of the pod 1 and then be supplied to the plant, the protrusion 12 of the pod 1 being provided to be in contact with the supply water in the depression 320.

Meanwhile, during the above-described water supply process, the residual water detection sensor 440, 742 may detect the water level of the supply water in the depression 320.

That is, the residual water detection sensor 440, 742 may check whether or not the supply water remains on the surface of the sensing protrusion 323 of the depression 320, and when the residual water detection sensor 440, 742 determines the remaining of the supply water, the operation of the water pump 720 may be stopped so that the supply water may not be supplied.

The water supply method of using the residual water detection sensor 440, 742 may be intended to prevent the residual water in the bed 300. That is, since the pod is received as much water as needed, occurrence of residual water due to excessive water supply and contamination of the produced residual water may be prevented.

In particular, considering that increasing amount of the supply water is needed as the plant grows, the method according to the embodiment of the present disclosure may be configured such that, when the plant absorbs more water, more water may be supplied to the bed, thus water may always be properly supplied even when enough moisture changes as the plant grow.

Consequently, the plant cultivation apparatus of the present disclosure may be configured such that air is suctioned and is discharged through the front surface of the machine chamber 201, despite having the closed-type structure. Accordingly, even when the apparatus is located in a specific narrow space such as the built-in method, the air circulation in the apparatus may be performed efficiently.

The plant cultivation apparatus of the present disclosure may be configured of the bed 300 of the forward ejected structure. Therefore, even when the plant cultivation apparatus is provided in a narrow space, maintenance, such as replacement of the pod 1 or cleaning of the bed 300, may be performed easily.

In the plant cultivation apparatus of the present disclosure, moisture supplied to plants may be always supplied only in an appropriate amount, so that residual water due to excessive water supply may be prevented and thus contamination and odor of the residual water may be prevented.

The plant cultivation apparatus of the present disclosure may be configured of a non-circulation structure in which supply water stored in the separate water tank 710 blocked from external environment may be supplied only when necessary, so that contamination of supply water may be prevented.

The plant cultivation apparatus of the present disclosure may adopt the structure in which air circulation may be performed for each cultivation room 121, 122. Accordingly, it is possible to cultivate various types of plants at the same time as the temperature control for plant cultivation may be performed for each cultivation room 121, 122.

As the plant cultivation apparatus of the present disclosure may be arranged and configured so as to easily remove the water tank 710, water replenishment or cleaning of the water tank 710 may be easily performed.

In the plant cultivation apparatus of the present disclosure, air circulating in the cultivation room 121, 122 may pass through the surface of the door 130 and then be discharged forward from the machine chamber 201, so that moisture on the surface of the door 130 may be removed, thereby facilitating internal observation.

The plant cultivation apparatus of the present disclosure may be configured such that air introduced in the machine chamber 201 passes through the condenser 620 and then is introduced into the rear space in the cabinet 100 without passing through the compressor 610. The temperature may be well controlled.

In the plant cultivation apparatus of the present disclosure, the bed 300 may have the depression 320 and the depression 320 may be formed in the track structure having the dam part 340 in the inside portion thereof. Accordingly, residual water may be minimized and the plurality of the pod 1 may absorb supply water at the same time.

In the plant cultivation apparatus of the present disclosure, the lighting module 401, 402 may divide the inside of the cabinet 100 into the upper cultivation room 121 and the lower cultivation room 122. Accordingly, the cultivation space may be secured as wide as possible compared to having a separate partition wall.

Meanwhile, according to the embodiment of the present disclosure, the plant cultivation apparatus is not limited to the structure of the embodiment described above.

That is, according to the embodiment of the present disclosure, regardless of the structure in the machine room, the plant cultivation apparatus may be used as the built-in product and may secure the cultivation room 121, 122 as large as possible, only by providing the structure in which the water tank 710 of the water supply module 700 is positioned between the bed 300 and the bottom surface in the inner casing 120.

The water tank 710 may be configured to be exposed indoors and be ejected forward by opening the door 130. Accordingly, the user can easily perform maintenance of supply water, thus preventing contamination or spoilage of supply water.

Hereinabove, the present disclosure is not necessarily limited to the embodiments, because all the components constituting the embodiments of the present disclosure are described as being combined into one or operated in combination. That is, within the scope of the present disclosure, all of the components may be selectively combined into one or more and be operated. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof. Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

Although the preferred embodiments of the present disclosure have been described for illustrative purposes, those skilled in the art will appreciate that various modifications, additions and substitutions are possible, without departing from the scope and spirit of the present disclosure as disclosed in the accompanying claims. Therefore, the preferred embodiments described above have been described for illustrative purposes, and should not be intended to limit the technical spirit of the present disclosure, and the scope and spirit of the present disclosure are not limited to the embodiments. The protective scope of the present disclosure should be interpreted by the accompanying claims, and all technical spirits within the equivalent scope should be interpreted as being included in the scope and spirit of the present disclosure.

The invention claimed is:

1. A pod for use in a plant cultivation apparatus, the pod comprising:
   a container defining a receiving space to receive at least one of a seed or a plant, and a medium containing nutrients for plant growth, the receiving space being open at an entrance at one side of the receiving space; and
   a cover shielding the entrance of the receiving space and extending to an inside of the container,
   wherein a protrusion protrudes downward from a bottom of the container in a direction away from the receiving space,
   wherein the protrusion comprises a protruding wall surrounding a seating space that communicates with the receiving space,
   wherein the pod further comprises an absorption material received in the seating space,
   wherein a slit is provided in a fore end of the protruding wall, so that external moisture is introduced through the slit and is absorbed by the absorption material,
   wherein the medium is received within the receiving space and above the protrusion,
   wherein the absorption material is configured to transfer the external moisture to the medium,
   wherein the protruding wall defines the seating space,
   wherein the absorption material is confined within the seating space,
   wherein the slit at the fore end of the protruding wall directly opens into the seating space, and
   wherein the protruding wall extends different distances from the bottom of the container at opposite sides of the slit to define a step in the fore end of the protruding wall at the slit.

2. The pod of claim 1, further comprising an absorbent paper that is positioned on a surface of a base at a bottom of the receiving space and between the base and the medium.

3. The pod of claim 1, wherein a sidewall and the protruding wall extend, respectively, at obtuse angles from a base at a bottom of the receiving space.

4. The pod of claim 3, further comprising a flange that extends from a fore end of the sidewall toward an outside of the container to be parallel to the base.

5. The pod of claim 4, further comprising a grip wall that is coupled to a fore end of the flange and extends perpendicularly toward the base.

6. The pod of claim 1, wherein the medium includes at least one nutrient solution capsule containing the nutrients for plant growth, and when the nutrient solution capsule is exposed to water, the nutrient solution capsule dissolves and the nutrients therein flow out to the medium.

7. The pod of claim 6, wherein the nutrient solution capsule has a different rate of dissolution in water depending on at least one of a thickness or a material of a portion of the nutrient solution capsule surrounding the nutrients.

8. The pod of claim 1, further comprising a seed paper on which one or more seeds are held and that is provided on an upper surface of the medium.

9. The pod of claim 8, further comprising a brick that is provided on an upper surface of the seed paper.

10. The pod of claim 9, wherein the brick includes vermiculite.

11. The pod of claim 1, wherein the cover comprises:
    an inner cover provided in the receiving space of the container to protect the inside of the container; and
    an outer cover attached to the container to shield the entrance of the receiving space.

12. The pod of claim 11, further comprising a tab that protrudes from an edge of the outer cover.

13. The pod of claim 11, wherein at least one of lettering or a plant image indicating a type of plant or seed received in the medium is provided on an outer surface of the outer cover.

14. The pod of claim 13, wherein plant information identifying at least one of a seed germination rate or a plant yield is provided on the outer surface of the outer cover.

15. A plant cultivation apparatus comprising:
    a cabinet providing a cultivation space;
    a door provided on the cabinet for opening and closing the cultivation space;
    a bed received in the cultivation space of the cabinet;
    a pod seated on the bed; and
    a water supply module provided between a bottom of the cultivation space and the bed in the cultivation space to supply water to the bed,
    wherein the pod comprises:
      a container having a receiving space to receive at least one of a seed or a plant, and a medium containing nutrients for plant growth, the receiving space being open at an entrance at one side of the receiving space; and
      a cover shielding the entrance of the receiving space, and extending to an inside of the container,
    wherein a protrusion protrudes downward from a bottom of the container in a direction away from the receiving space,
    wherein the protrusion comprises a protruding wall surrounding a seating space that communicates with the receiving space,
    wherein the pod further comprises an absorption material received in the seating space,
    wherein a slit is provided in a fore end of the protruding wall, so that external moisture is introduced through the slit and is absorbed by the absorption material,
    wherein the medium is received within the receiving space and above the protrusion,
    wherein the absorption material is configured to transfer the external moisture to the medium,
    wherein the protruding wall defines the seating space, wherein the absorption material is confined within the seating space, wherein the slit at the fore end of the protruding wall directly opens into the seating space, and wherein the protruding wall extends different distances from the bottom of the container at opposite sides of the slit to define a step in the fore end of the protruding wall at the slit.

16. The plant cultivation apparatus of claim 15, wherein the container comprises:

a base provided at a bottom of the receiving space; and a sidewall provided along an edge of the base, and wherein the protrusion protrudes from the base in a direction away from the receiving space.

17. The plant cultivation apparatus of claim 15, wherein at least one of lettering or an image indicating a type of plant grown in the pod is provided on an outer surface of the cover.

18. The pod of claim 1, wherein the cover includes seeding holes, and wherein the cover includes guide holes formed at positions corresponding to positions of the seeding holes.

\* \* \* \* \*